(12) United States Patent
Zhang et al.

(10) Patent No.: US 12,536,719 B2
(45) Date of Patent: Jan. 27, 2026

(54) GRAFFITI PATTERN GENERATION METHOD AND APPARATUS, ELECTRONIC DEVICE, AND STORAGE MEDIUM

(71) Applicant: HUAWEI TECHNOLOGIES CO., LTD., Guangdong (CN)

(72) Inventors: Yundie Zhang, Shenzhen (CN); Anqi Liu, Shenzhen (CN); Aibing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 18/006,508

(22) PCT Filed: Jul. 22, 2021

(86) PCT No.: PCT/CN2021/107892
§ 371 (c)(1),
(2) Date: Jan. 23, 2023

(87) PCT Pub. No.: WO2022/022381
PCT Pub. Date: Feb. 3, 2022

(65) Prior Publication Data
US 2023/0298235 A1 Sep. 21, 2023

(30) Foreign Application Priority Data
Jul. 27, 2020 (CN) .................... 202010730341.X

(51) Int. Cl.
*G06T 11/60* (2006.01)
*G06T 3/60* (2024.01)
*G06T 11/20* (2006.01)

(52) U.S. Cl.
CPC ............... *G06T 11/60* (2013.01); *G06T 3/60* (2013.01); *G06T 11/203* (2013.01); *G06T 2200/24* (2013.01)

(58) Field of Classification Search
CPC ......... G06T 11/60; G06T 11/206; G06T 3/60; G06T 2200/24; G06T 11/203; G06F 9/451
See application file for complete search history.

(56) References Cited

U.S. PATENT DOCUMENTS

2011/0075200 A1* 3/2011 Goldwater ......... H04N 1/00307
358/1.18
2018/0348887 A1* 12/2018 Paik ...................... G06F 40/109
(Continued)

FOREIGN PATENT DOCUMENTS

| CN | 102332171 A | | 1/2012 | |
| CN | 111415396 A | * | 7/2020 | |
| EP | 1708141 A2 | * | 10/2006 | ............. G06T 11/20 |

OTHER PUBLICATIONS

Extended European Search Report in European Appln No. 21849215.5, dated Dec. 6, 2023, 7 pages.

*Primary Examiner* — Frank S Chen
(74) *Attorney, Agent, or Firm* — Fish & Richardson P.C.

(57) ABSTRACT

Example graffiti pattern generation methods, electronic devices, and storage media are provided. One example graffiti pattern generation method includes displaying a setting interface of a graffiti pattern of the electronic device. Text information entered by a user in the setting interface is obtained. Attribute information of a graffiti letter image associated with the text information is determined based on the text information. A combination command corresponding to the attribute information is executed, and combination processing is performed on the graffiti letter image to obtain the graffiti pattern.

20 Claims, 27 Drawing Sheets

(56) References Cited

U.S. PATENT DOCUMENTS

2019/0129520 A1\* 5/2019 Shin ................ H04N 23/00
2020/0090242 A1\* 3/2020 Tuchler ............. G06Q 30/0643

\* cited by examiner (a)

(b)

GRAFFITI PATTERN GENERATION METHOD AND APPARATUS, ELECTRONIC DEVICE, AND STORAGE MEDIUM

CROSS-REFERENCE TO RELATED APPLICATIONS

This application is a National Stage of International Application No. PCT/CN2021/107892, filed on Jul. 22, 2021, which claims priority to Chinese Patent 202010730341.X, filed on Jul. 27, 2020. Both of the aforementioned applications are hereby incorporated by reference in their entireties.

TECHNICAL FIELD

This application pertains to the field of terminal software technologies, and in particular, to a graffiti pattern generation method and apparatus, an electronic device, and a storage medium.

BACKGROUND

With development and popularization of an electronic device, the electronic device has more abundant on-screen display functions, to meet personalized requirements imposed by a user on on-screen display in various application scenarios. The on-screen display function of the electronic device is applied to scenarios including but not limited to a scenario in which a pattern is displayed in a screen-off state or a screen-locked state.

Currently, when the electronic device is in the screen-off state, the screen-locked state, or a photographing state, the electronic device may support various types of patterns, including a character-type graffiti pattern. Usually, the electronic device sets, in a corresponding application scenario, a fixed pattern that is stored locally or provided by a market application, to display a selected pattern. If a large quantity of pictures are downloaded, a very large amount of memory is occupied. Consequently, a displayed pattern type is limited, and a personalized requirement of the user cannot be met.

SUMMARY

This application discloses a graffiti pattern generation method and apparatus, an electronic device, and a storage medium, so that a plurality of graffiti patterns can be generated based on a letter image, to save storage space of the electronic device, and improve performance of a personalized application of the electronic device.

According to a first aspect, an embodiment of this application provides a graffiti pattern generation method. The method includes: displaying a setting interface of a graffiti pattern of an electronic device; obtaining text information entered by a user in the setting interface, and determining, based on the text information, attribute information of a graffiti letter image associated with the text information; and executing a combination command corresponding to the attribute information, and performing combination processing on the graffiti letter image, to obtain the graffiti pattern.

In this embodiment of this application, in the setting interface of the graffiti pattern of the electronic device, the electronic device may receive the text information entered by the user. The electronic device performs combination processing on the graffiti character image based on the attribute information of the graffiti letter image correspondingly associated with the text information, to generate a plurality of graffiti patterns based on different graffiti letter images. A manner in which the electronic device downloads and stores a large quantity of pictures in advance, occupying storage space does not need to be performed, to save storage space of the electronic device, improve performance of a personalized application of the electronic device, and meet a personalized requirement of the user for the electronic device. There is strong usability and practicability.

With reference to the first aspect, in some embodiments, the attribute information includes a ratio of an overlapping area between a first graffiti letter image and a second graffiti letter image; and if the text information is associated with a plurality of graffiti letter images, the executing a combination command corresponding to the attribute information, and performing combination processing on the graffiti letter image includes:

obtaining a first total quantity of opaque pixels in the first graffiti letter image and opaque pixels in the second graffiti letter image; obtaining a second total quantity of opaque pixels in the overlapping area between the first graffiti letter image and the second graffiti letter image, where the opaque pixel in the overlapping area is an opaque pixel in both of the first graffiti letter image and the second graffiti letter image; and using a ratio of the second total quantity to the first total quantity as the ratio of the overlapping area, and performing combination processing on the first graffiti letter image and the second graffiti letter image based on the ratio of the overlapping area if the ratio of the overlapping area meets a preset threshold, where the first graffiti letter image and the second graffiti letter image are two adjacent images in the plurality of graffiti letter images.

With reference to the first aspect, in some embodiments, if the first graffiti letter image is located on a left side of the second graffiti letter image, an overlapping relationship of the overlapping area is that a first layer is located on a previous layer of a second layer, the first layer is a layer at which the first graffiti letter image is located, and the second layer is a layer at which the second graffiti letter image is located.

It can be understood that, if a combination pair of right edge information and left edge information of two adjacent graffiti letter images does not match a corresponding spacing combination command, the electronic device may further read opaque pixel information of each graffiti letter image in the foregoing manner, and in a graffiti letter image combination process, an overlapping area and an overlapping relationship between two adjacent graffiti letters are determined, to generate a graffiti pattern including various graffiti letters, so as to meet a personalized requirement of the user.

With reference to the first aspect, in some embodiments, the attribute information includes tilt angle information of each graffiti letter image, the combination command includes an angle combination command, and if the text information is associated with a plurality of graffiti letter images, the executing a combination command corresponding to the attribute information, and performing combination processing on the graffiti letter image includes:

executing, based on an association relationship between the tilt angle information of the graffiti letter image and location information of the graffiti letter image in the plurality of graffiti letter images, the angle combination command corresponding to the association relationship, and adjusting an angle of the graffiti letter image based on the tilt angle information corresponding to the location information.

For example, when arranging the plurality of associated graffiti letter images based on a sequence of letters or characters in the text information input by the user, the electronic device adjusts a tilt angle of a graffiti letter image based on a location at which the graffiti letter image is located, and sets different tilt angles for a same letter at different locations, to ensure that a finally generated graffiti pattern is more aggregated.

With reference to the first aspect, in some embodiments, the attribute information includes left edge information and right edge information of each graffiti letter image, the combination command includes a spacing combination command, and if the text information is associated with a plurality of graffiti letter images, the executing a combination command corresponding to the attribute information, and performing combination processing on the graffiti letter image includes:

executing, based on a combination pair of right edge information of a first graffiti letter image and left edge information of a second graffiti letter image, the spacing combination command corresponding to the combination pair, and performing combination processing on the first graffiti letter image and the second graffiti letter image based on a preset spacing, where the first graffiti letter image and the second graffiti letter image are two adjacent images in the plurality of graffiti letter images, the first graffiti letter image is located on a left side of the second graffiti letter image, the left edge information and the right edge information are respectively used to represent shape information of a left edge and a right edge of the graffiti letter image.

It can be understood that, if the text information entered by the user includes a plurality of letters or a plurality of characters, words, or phrases, there is a sequential arrangement order of the plurality of letters or the plurality of characters, to form a word or phrase with a specific meaning. Therefore, the electronic device can construct a graffiti pattern of a corresponding word or phrase based on the plurality of graffiti letter images associated with the text information.

With reference to the first aspect, in some embodiments, the method further includes:

obtaining pixel coordinates of an opaque pixel on each of the left edge and the right edge of the graffiti letter image; and determining the left edge information and the right edge information of each graffiti letter image based on the pixel coordinates.

It can be understood that, the left edge information and the right edge information of the graffiti letter image may be edge shape information that is set for each graffiti letter image in a font library of the graffiti letter; or may be edge shape information determined based on the pixel coordinates that are of the opaque pixel on each of the left edge and the right edge of the graffiti letter image and that are obtained in the foregoing manner.

With reference to the first aspect, in some embodiments, the text information is further associated with a background image of the graffiti letter image, a size of the background image is greater than a size of the graffiti letter image, the background image is in a one-to-one correspondence with the graffiti letter image, and the method further includes:

calculating a location of the background image based on a central location of the graffiti letter image, the size of the graffiti letter image, and the size of the background image, to obtain an overall background image corresponding to a plurality of graffiti letter images; and disposing layers of the plurality of graffiti letter images above a layer at which the overall background image is located, to obtain the graffiti pattern with an edge.

With reference to the first aspect, in some embodiments, the method further includes: displaying the graffiti pattern in a screen-off interface, a lock screen interface, or a camera photographing interface of the electronic device.

It can be understood that, the electronic device may generate, based on a system setting function or a graffiti pattern setting application, a graffiti pattern applied to a lock screen interface; or may generate a graffiti pattern applied to an unlocking interface; or may generate, based on a system setting function or a camera setting function, a graffiti pattern applied to a camera photographing interface, for example, a watermark pattern in the camera photographing interface.

According to a second aspect, an embodiment of this application provides a graffiti pattern generation apparatus. The apparatus includes:

a display unit, configured to display a setting interface of a graffiti pattern of an electronic device;

an obtaining unit, configured to: obtain text information entered by a user in the setting interface, and determine, based on the text information, attribute information of a graffiti letter image associated with the text information; and a processing unit, configured to: execute a combination command corresponding to the attribute information, and perform combination processing on the graffiti letter image, to obtain the graffiti pattern.

According to a third aspect, an embodiment of this application provides an electronic device, including one or more processors; one or more memories; a plurality of applications; and one or more programs. The one or more programs are stored in the memory, and when the one or more programs are executed by the processor, the electronic device is enabled to perform the method provided in any one of the first aspect or the possible implementations of the first aspect.

According to a fourth aspect, an embodiment of this application provides a computer-readable storage medium. The computer-readable storage medium stores a computer program, the computer program includes instructions, and when the instruction runs on an electronic device, the electronic device is enabled to perform the method provided in any one of the first aspect or the possible implementations of the first aspect.

According to a fifth aspect, an embodiment of this application provides a computer program product including instructions. When the computer program product runs on an electronic device, the electronic device is enabled to perform the method provided in any one of the first aspect or the possible implementations of the first aspect.

It can be understood that the graffiti pattern generation apparatus in the second aspect, the electronic device in the third aspect, the computer-readable storage medium in the fourth aspect, or the computer program product including instructions in the fifth aspect are all used to perform the method provided in any one of the first aspect or the possible implementations of the first aspect. Therefore, for beneficial effects that can be achieved by the graffiti pattern generation apparatus in the second aspect, the electronic device in the third aspect, the computer-readable storage medium in the fourth aspect, or the computer program product including instructions in the fifth aspect, refer to beneficial effects in the corresponding method. Details are not described herein again.

BRIEF DESCRIPTION OF DRAWINGS

The following describes the accompanying drawings used in embodiments of this application.

DESCRIPTION OF EMBODIMENTS

Figure 1:
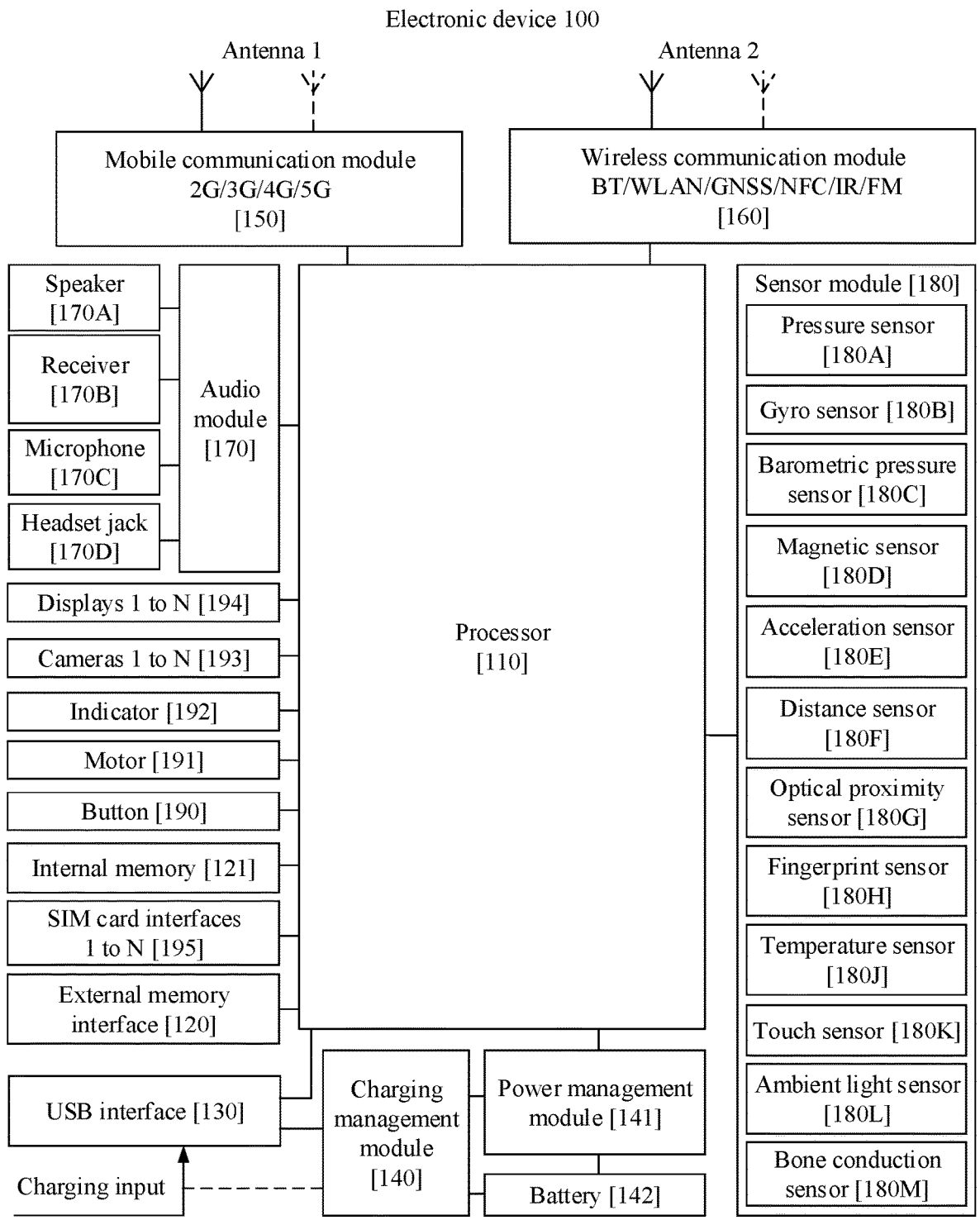
FIG. 1 is a schematic diagram of a structure of an electronic device 100 according to an embodiment of this application.

The following describes embodiments of this application with reference to the accompanying drawings in embodiments of this application. Terms used in embodiments of this application are only used to explain specific embodiments of this application, but are not intended to limit this application.

To clearly describe the technical solutions in embodiments of this application, words such as "first" and "second" are used in embodiments of this application to distinguish between same items or similar items that have basically the same functions or purposes. For example, a first graffiti letter image and a second graffiti letter image are merely used to distinguish between images at different locations, and a first layer and a second layer are merely used to distinguish between different layers. A sequence of the first graffiti letter image and the second graffiti letter image and a sequence of the first layer and the second layer are not limited. Persons skilled in the art may understand that the words such as "first" and "second" do not limit a quantity or an execution sequence, and the words such as "first" and "second" do not indicate a definite difference.

It should be noted that, in this application, the word such as "example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

An electronic device that generates a graffiti pattern and a service scenario described in embodiments of this application are used to describe technical solutions in embodiments of this application more clearly, but does not constitute a limitation on the technical solutions provided in embodiments of this application. Persons of ordinary skill in the art may learn that, with intelligent development of the electronic device and emergence of a new service scenario, the technical solutions provided in embodiments of this application are also applicable to a similar technical problem.

In this application, at least one means one or more, and a plurality of means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

Steps in the graffiti pattern generation method provided in embodiments of this application are merely examples. Not all steps are mandatory steps, or content in each piece of information or a message is mandatory. In a use process, the step or the content may be increased or decreased based on a requirement.

In different embodiments, mutual reference is made to a same step or steps or messages having a same function in embodiments of this application.

The service scenario described in embodiments of this application is used to describe technical solutions in embodiments of this application more clearly, but does not constitute a limitation on the technical solutions provided in embodiments of this application. Persons of ordinary skill in the art may learn that, with intelligent development of the electronic device and emergence of the new service scenario, the technical solutions provided in embodiments of this application are also applicable to a similar technical problem.

Currently, the electronic device has more abundant on-screen display functions. Personalized display of a screen may be set by using a system setting function. For example, a screen-off pattern, a screen locking pattern, an unlocking pattern, or a watermark pattern of a camera. The electronic device sets an on-screen display or a watermark pattern by using only a few patterns that are downloaded or match the system. An application of some letter-type graffiti patterns is greatly limited, unless a large quantity of matching patterns are downloaded, to occupy more memory. Therefore, a graffiti pattern generation method is required, to perfect a personalized application and functional selection of on-screen display of the electronic device, so that more personalized requirements of a user are met without affecting memory of the electronic device.

An embodiment of this application provides a graffiti pattern generation method, which may be applied to an electronic device. When a user sets a corresponding on-screen display function by using a system function of the electronic device, text information of a required pattern may be entered, and the electronic device performs combination processing on a graffiti letter image correspondingly associated with the text information, to generate a plurality of graffiti patterns, so as to save storage space of the electronic device, and improve performance of a personalized application of the electronic device.

The graffiti pattern generation method provided in this embodiment of this application may be applied to an electronic device, for example, a mobile phone, a tablet computer, a wearable device, a vehicle-mounted device, an augmented reality (augmented reality, AR)/virtual reality (virtual reality, VR) device, a notebook device, a netbook, or a personal digital assistant (personal digital assistant, PDA). A specific type of the electronic device is not limited in this embodiment of this application is not limited.

For example, FIG. 1 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may be further configured to connect to another electronic device such as an AR device.

It may be understood that an interface connection relationship between the modules that is shown in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to be connected to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may also be disposed in a same device.

A wireless communication function of the electronic device 100 may be implemented by using the antenna 1, the antenna 2, the mobile communication module 150, the wireless communication module 160, the modem processor, the baseband processor, or the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication including 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, an Android system of a layered architecture is used as an example to illustrate the software structure of the electronic device 100.

Figure 2:
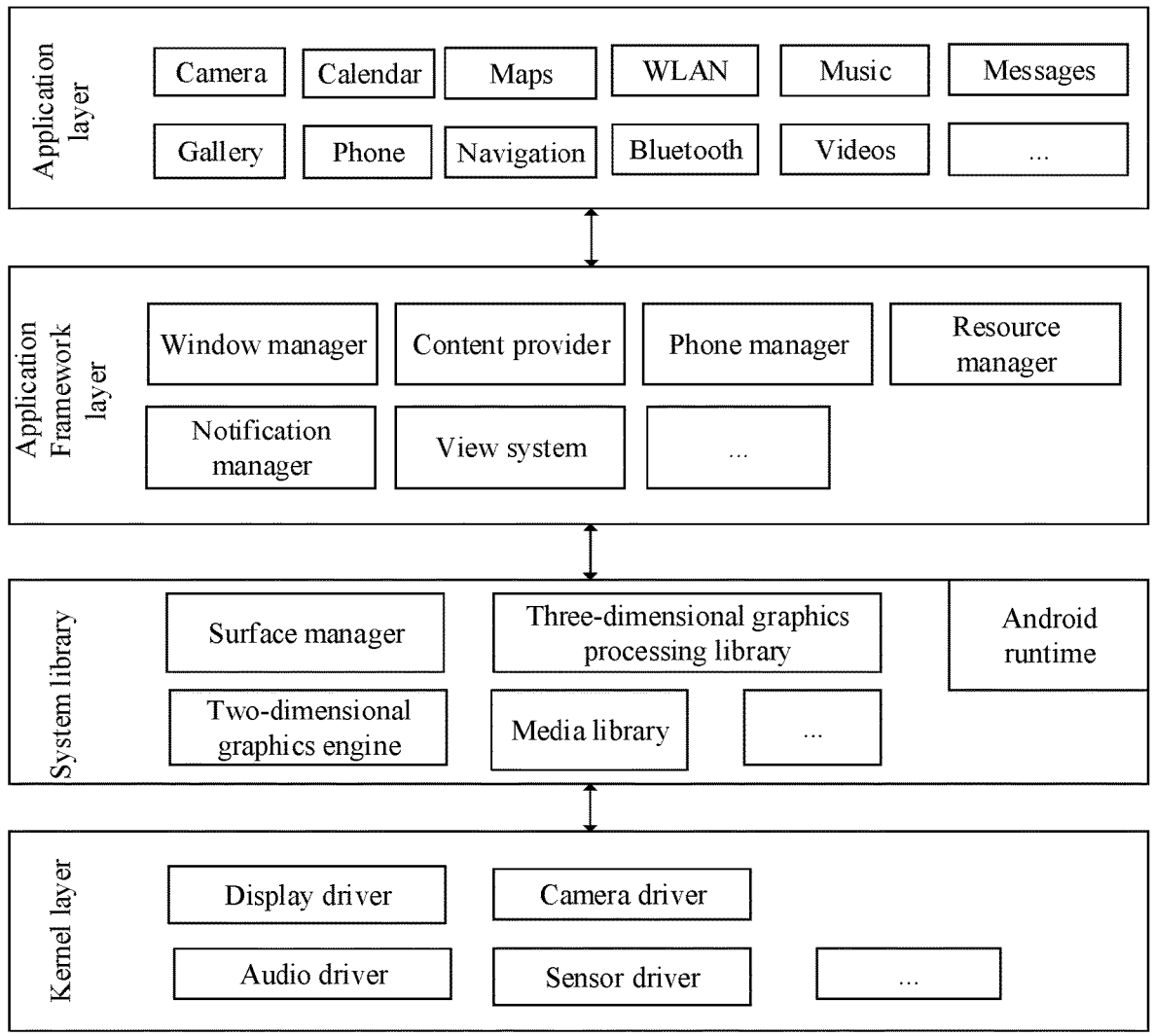
FIG. 2 is a block diagram of a software structure of an electronic device 100 according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application package may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules such as a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library supports a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following provides example descriptions of working procedures of software and hardware of the electronic device 100 with reference to an application scenario in which a graffiti pattern is set.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch and tap operation, and a control corresponding to the tap operation is a control of a system setting icon or a camera application icon. A system setting or a camera application invokes an interface of the application framework layer to start a display setting function or the camera application, and further starts a display driver or a camera driver by invoking a kernel layer, to open a display interface in which the graffiti pattern is set.

For ease of understanding, a graffiti pattern generation method provided in an embodiment of this application is specifically described with reference to the accompanying drawings and an application scenario by using an electronic device of structures in FIG. 1 and FIG. 2 is used as an example in the following embodiments of this application.

To generate various graffiti patterns, in this application, text information entered by a user is received in a setting interface of the graffiti pattern of the electronic device. The electronic device performs combination processing on the graffiti character image based on attribute information of a graffiti letter image corresponding to the text information, to generate a plurality of graffiti patterns based on different graffiti letter images. A manner in which the electronic device downloads and stores a large quantity of pictures in advance, occupying storage space does not need to be performed, to save storage space of the electronic device, and improve performance of a personalized application of the electronic device.

In this application, a mobile phone is used as an electronic device, and a graffiti pattern generation method provided in this application is described in detail. The method is mainly applied to the following scenarios.

Scenario 1

FIG. 3(a), FIG. 3(b), FIG. 3(c), FIG. 3(d), and FIG. 3A are schematic diagrams of user interfaces (graphical user interface, GUI) in which a graffiti pattern is generated according to an embodiment of this application.

Figure 3A:
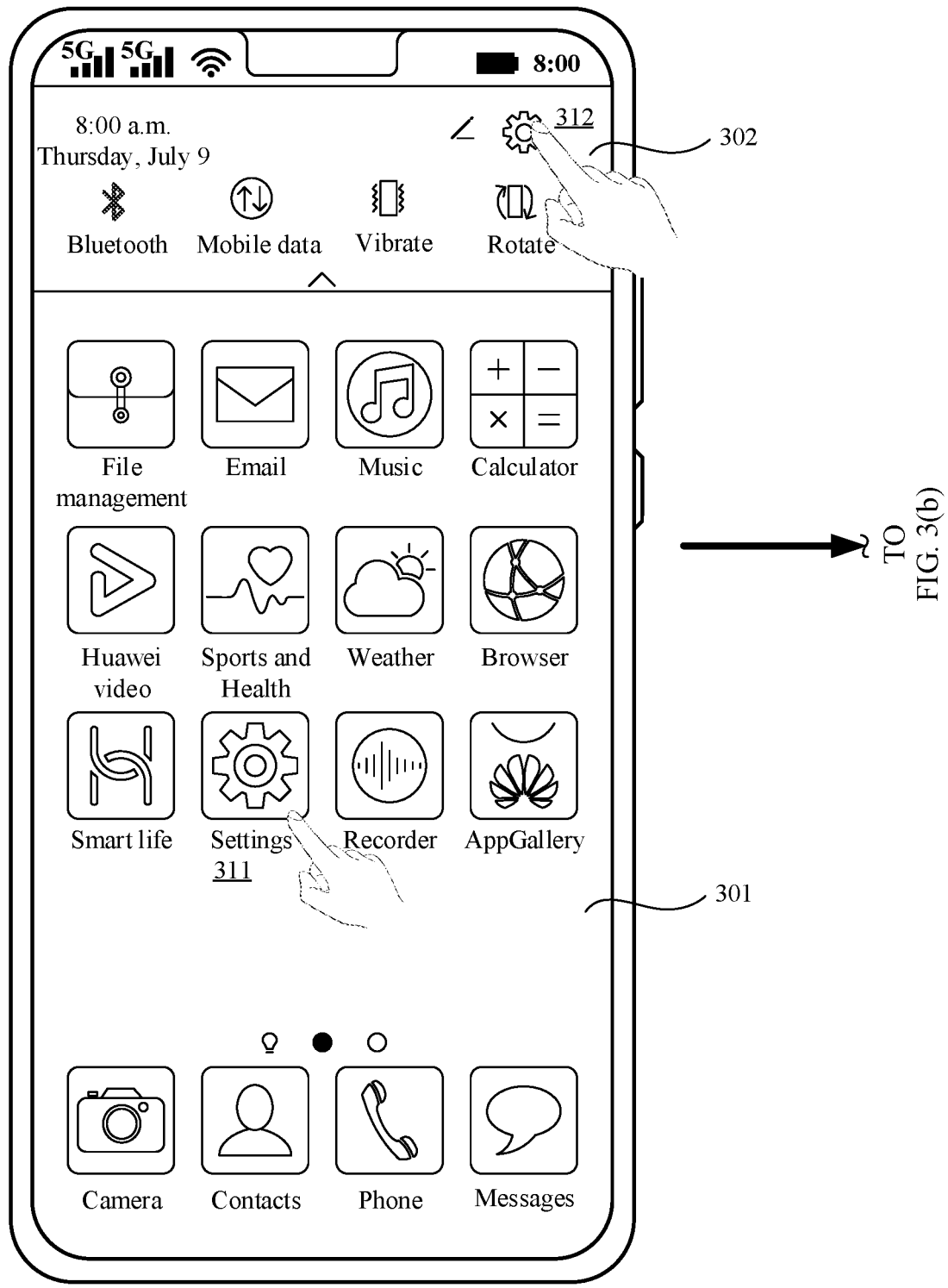
FIG. 3(a), FIG. 3(b), FIG. 3(c), FIG. 3(d), and FIG. 3A are schematic diagrams of user interfaces in which a graffiti pattern is generated according to an embodiment of this application.

FIG. 3(a) shows that an on-screen display system of a mobile phone displays currently output interface content in an unlocked mode of a mobile phone. The interface content 301 is a home screen of the mobile phone. The interface content 301 displays a plurality of third-party applications (application, APP), for example, File management, Email, Music, Calculator, Settings 311, and Camera. It should be understood that the interface content may further include more other applications. This is not limited in this application. The on-screen display system of the mobile phone further displays an interface of a drop-down list 302, and the interface of the drop-down list 302 may further include icons corresponding to controls such as Bluetooth, Mobile data, Vibrate, Rotate, and Settings 312.

Figure 3B:
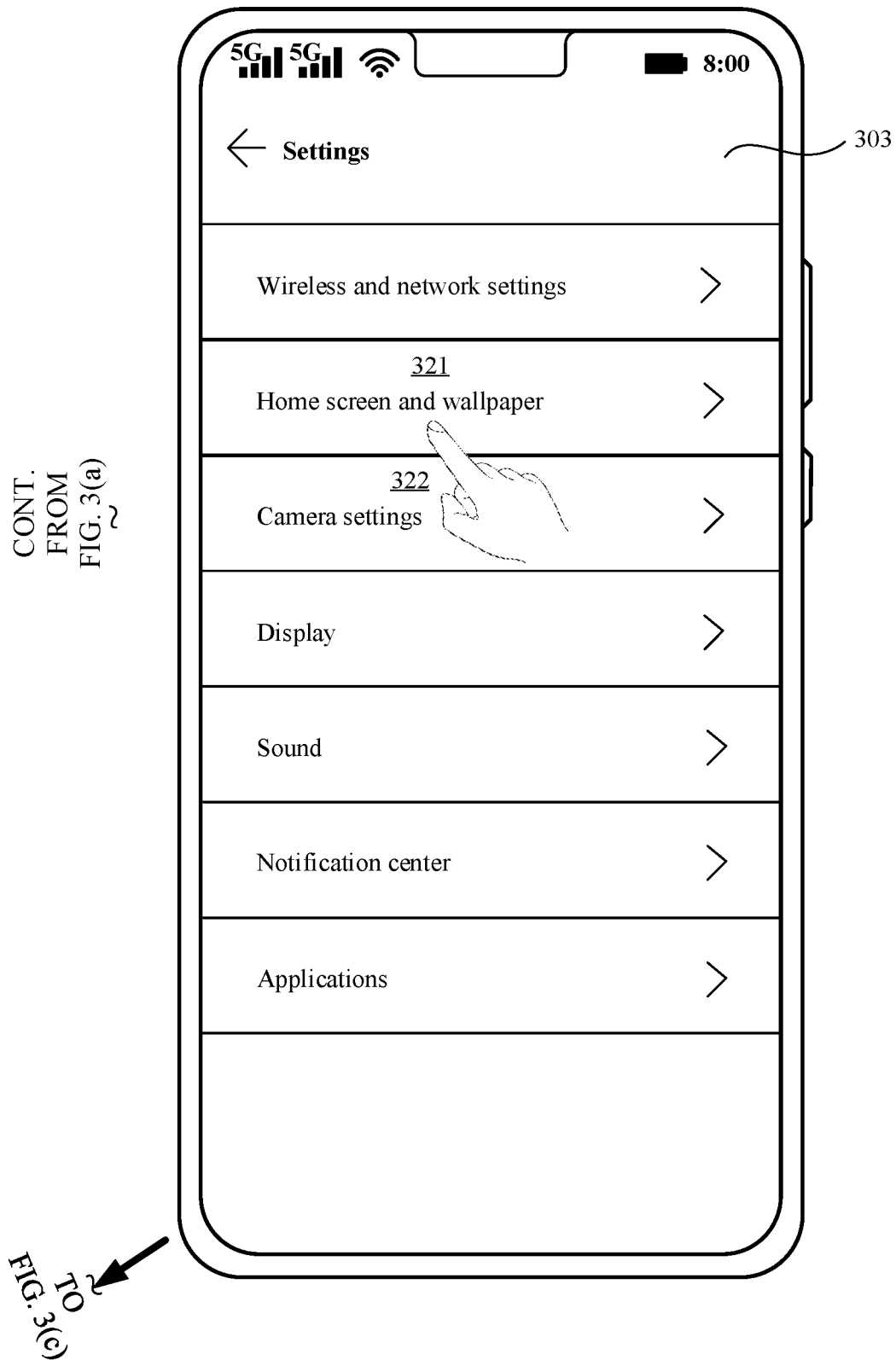

After detecting an operation that a user taps Settings 311 on the home screen or an icon of Settings 312 in the drop-down list 302 on a screen, the mobile phone may start a system setting application, to display an interface shown in FIG. 3(b). The interface may be a system setting interface, and the system setting interface includes controls such as Wireless and network settings, Screen and wallpaper 321, and Camera settings 322.

Figure 3C:
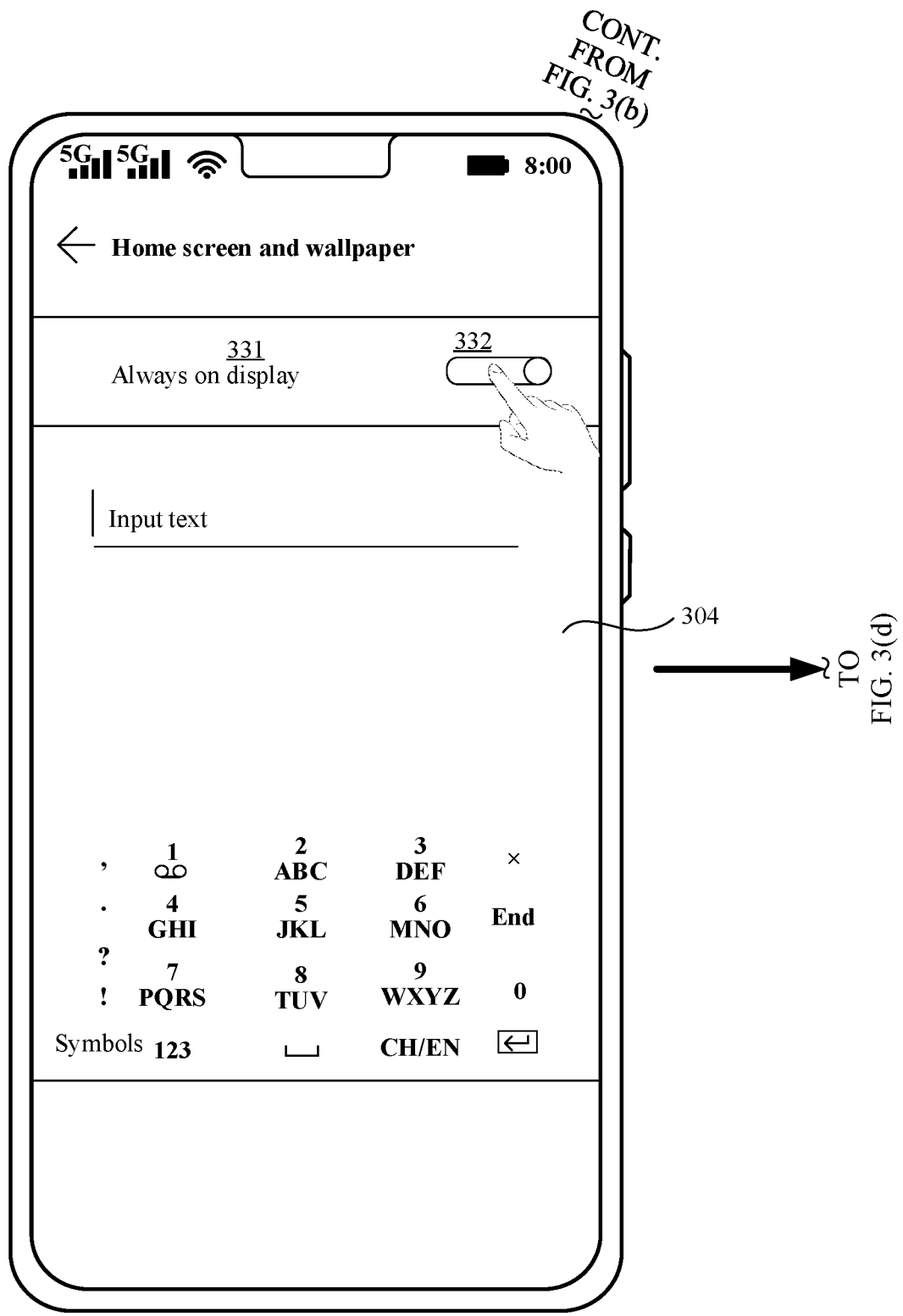

As shown in FIG. 3(b), after detecting an operation that the user taps an icon of the application Screen and wallpaper 321 in the system setting interface 303, the mobile phone starts the application Screen and wallpaper, and displays an interface shown in FIG. 3(c). The interface may be referred to as a setting interface 304 of a graffiti pattern. The setting interface 304 may include Always on display 331, a text input area, a keyboard area, and the like.

Always on display 331 corresponds to displaying of a screen-off pattern or non-displaying of a pattern in the screen-off state of the mobile phone. It can be understood that when a switch control 332 corresponding to Always on display 331 is in an on state, the mobile phone may display a corresponding screen-off pattern in the screen-off state, and when the switch control 332 is in an off state, the mobile phone does not display the pattern.

Figure 3D:
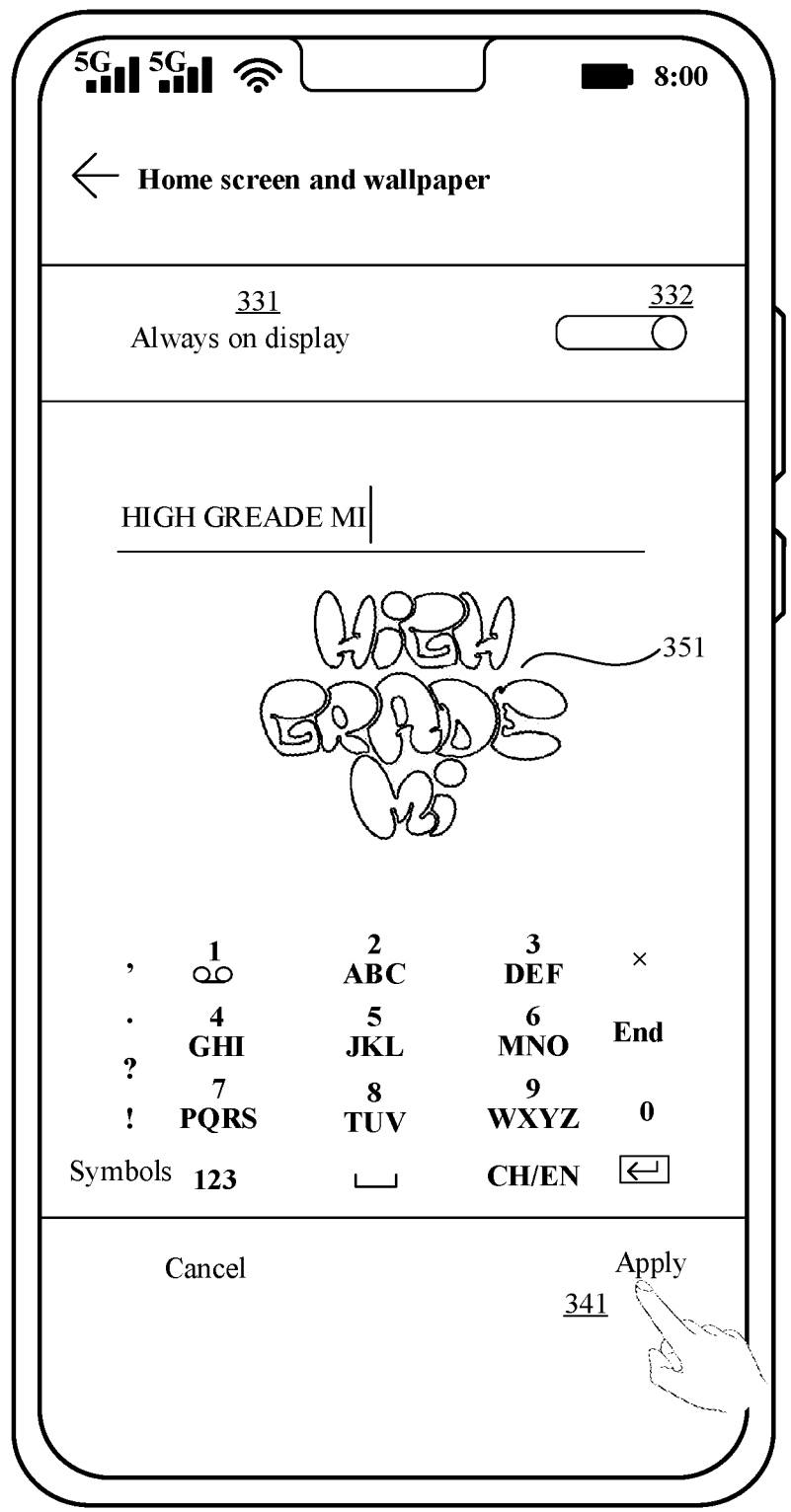
Figure 3A:
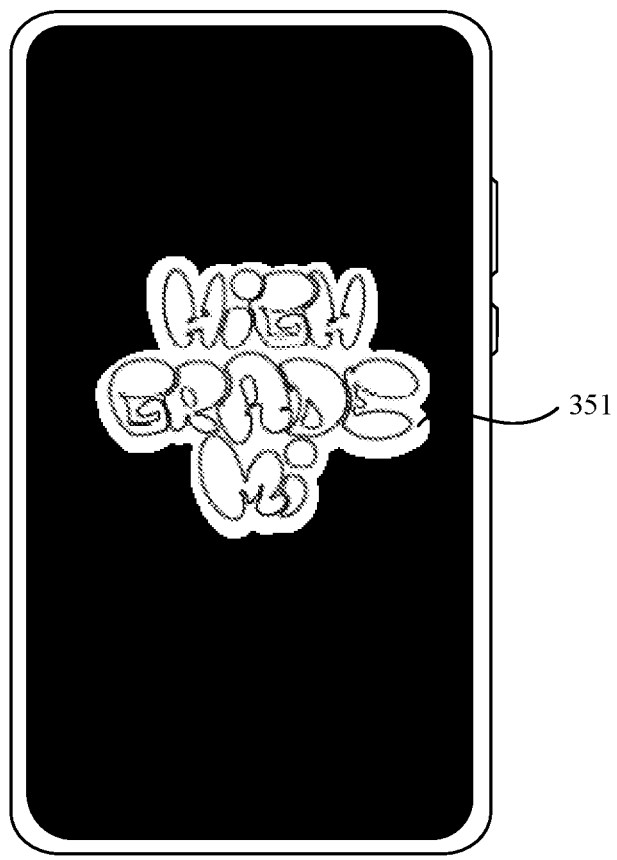

As shown in FIG. 3(c), after the mobile phone detects an operation that the user taps the switch control 332 corresponding to an icon of Always on display 331 in the setting interface 304, the switch control 332 displays the on state, and the setting interface 304 displays the text display area and the keyboard area. The mobile phone receives text information entered by the user in the text input area. As shown in FIG. 3(d), after the mobile phone receives text information "HIGH GREAT MI" entered by the user, and detects that the user taps an icon of a control "End" in the keyboard area, the mobile phone retrieves a graffiti letter image associated with the text information in a font library, and performs combination processing on the graffiti letter image based on a sequence of the text information, to generate and display a graffiti pattern 351 corresponding to the text information. After detecting an operation that the user taps an icon of Apply 341 in the setting interface 304, the mobile phone applies the generated graffiti pattern 351 to an interface of Always on display.

For example, as shown in FIG. 3A, when the mobile phone switches to the screen-off state, the graffiti pattern 351 is displayed. The graffiti pattern 351 displayed in FIG. 3(d) and FIG. 3A is merely described as an example, and a specific color of the graffiti pattern is not specifically limited.

It can be understood that the mobile phone transmits pixel drive voltage information of the generated graffiti pattern 351 to a display driver of Always on display, and the display driver drives, based on the pixel drive voltage information, a display panel of a screen of the mobile phone to display the graffiti pattern. A driving manner of a drive voltage is set, to further dynamically display the graffiti pattern in different areas of the display panel.

It should be further understood that, when the switch control 332 of the application Always on display 332 is in the on state, not only the text input area and the keyboard area are displayed, but also an icon of a setting control for setting another screen-off pattern may be displayed, for example, an icon of a control such as a screen-off signature and a screen-off time pattern.

Scenario 2

FIG. 4(a), FIG. 4(b), FIG. 4(c), FIG. 4(d), and FIG. 4A are schematic diagrams of other user interfaces (graphical user interface, GUI) in which a graffiti pattern is generated according to an embodiment of this application.

Figure 4A:
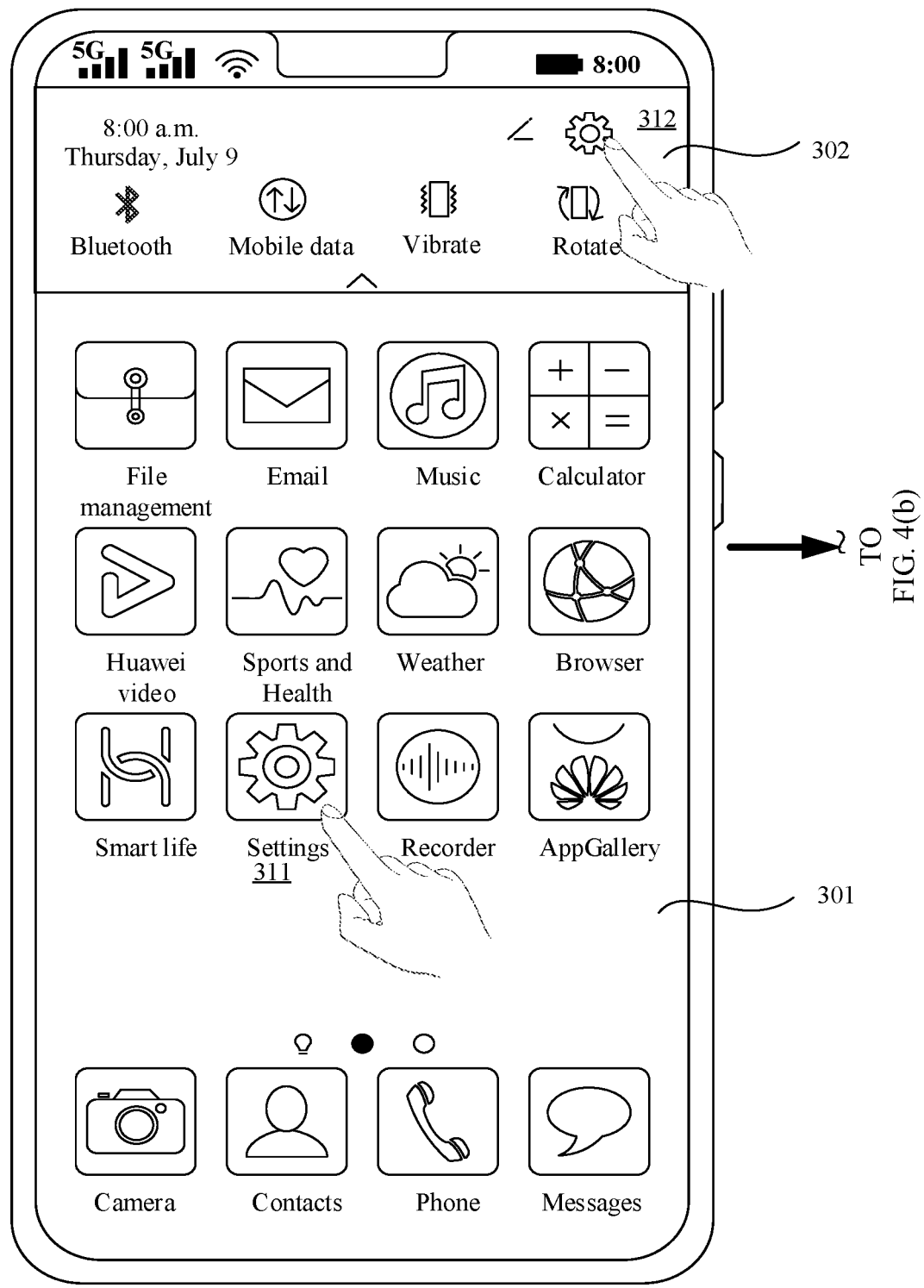
FIG. 4(a), FIG. 4(b), FIG. 4(c), FIG. 4(d), and FIG. 4A are schematic diagrams of other user interfaces in which a graffiti pattern is generated according to an embodiment of this application.

Herein, FIG. 4(a) is the same as FIG. 3(a), and shows that an on-screen display system of a mobile phone displays currently output interface content in an unlocked mode of the mobile phone. The interface content 301 is a home screen of the mobile phone. The interface content 301 displays a plurality of third-party applications (application, APP), for example, File management, Email, Music, Calculator, Settings 311, and Camera. In addition, the on-screen display system of the mobile phone further displays an interface of a drop-down list 302, and the interface of the drop-down list 302 may further include icons corresponding to controls such as Bluetooth, Mobile data, Vibrate, Rotate, and Settings 312.

Figure 4B:
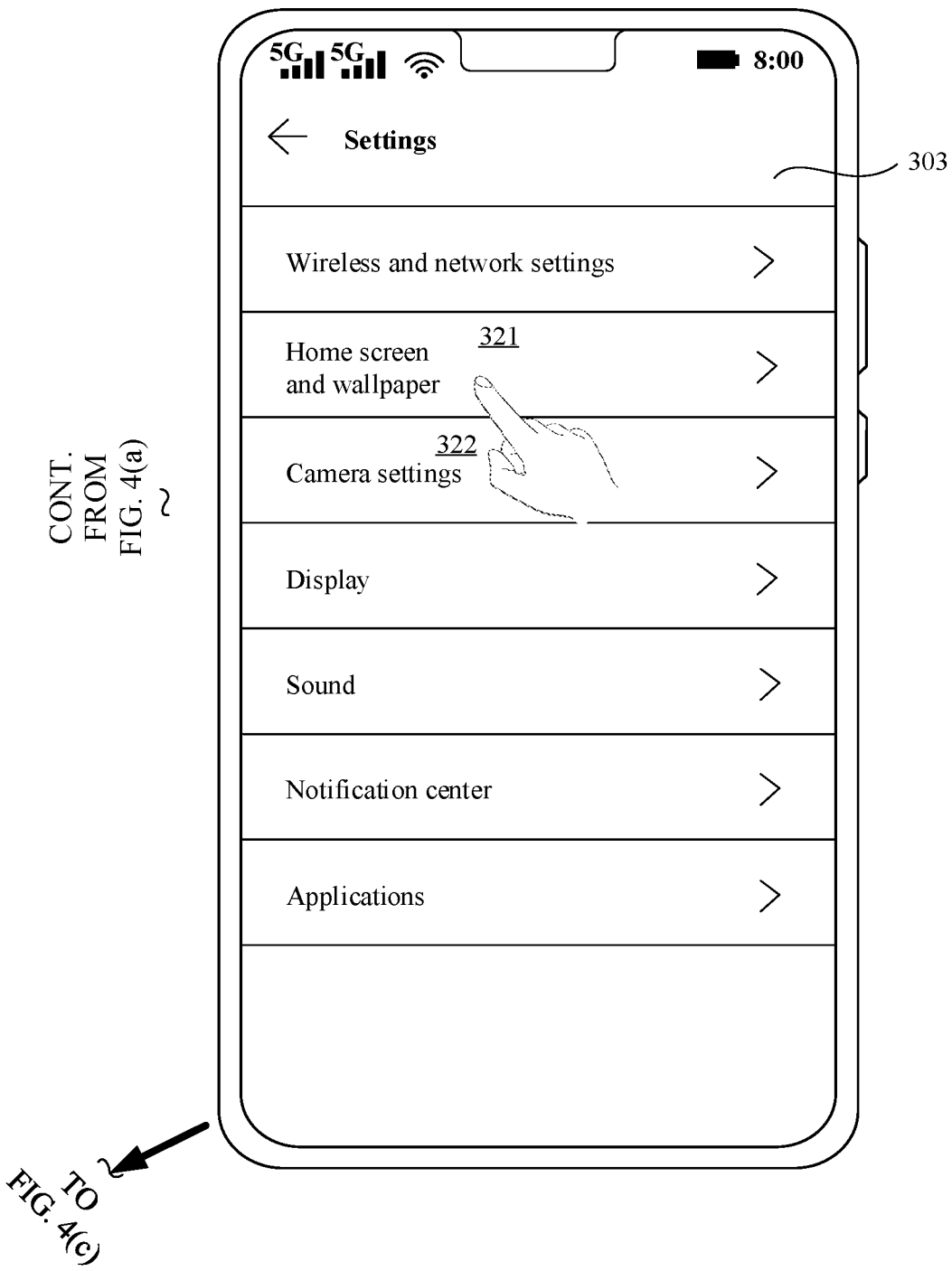

The same as FIG. 3(b), after detecting an operation that a user taps Settings 311 on the home screen or an icon of Settings 312 in the drop-down list 302 on a screen, the mobile phone may start a system setting application, to display an interface shown in FIG. 4(b). The interface may be a system setting interface 303, and the system setting interface 303 includes controls such as Wireless and network settings, Screen and wallpaper 321, and Camera settings 322.

Figure 4C:
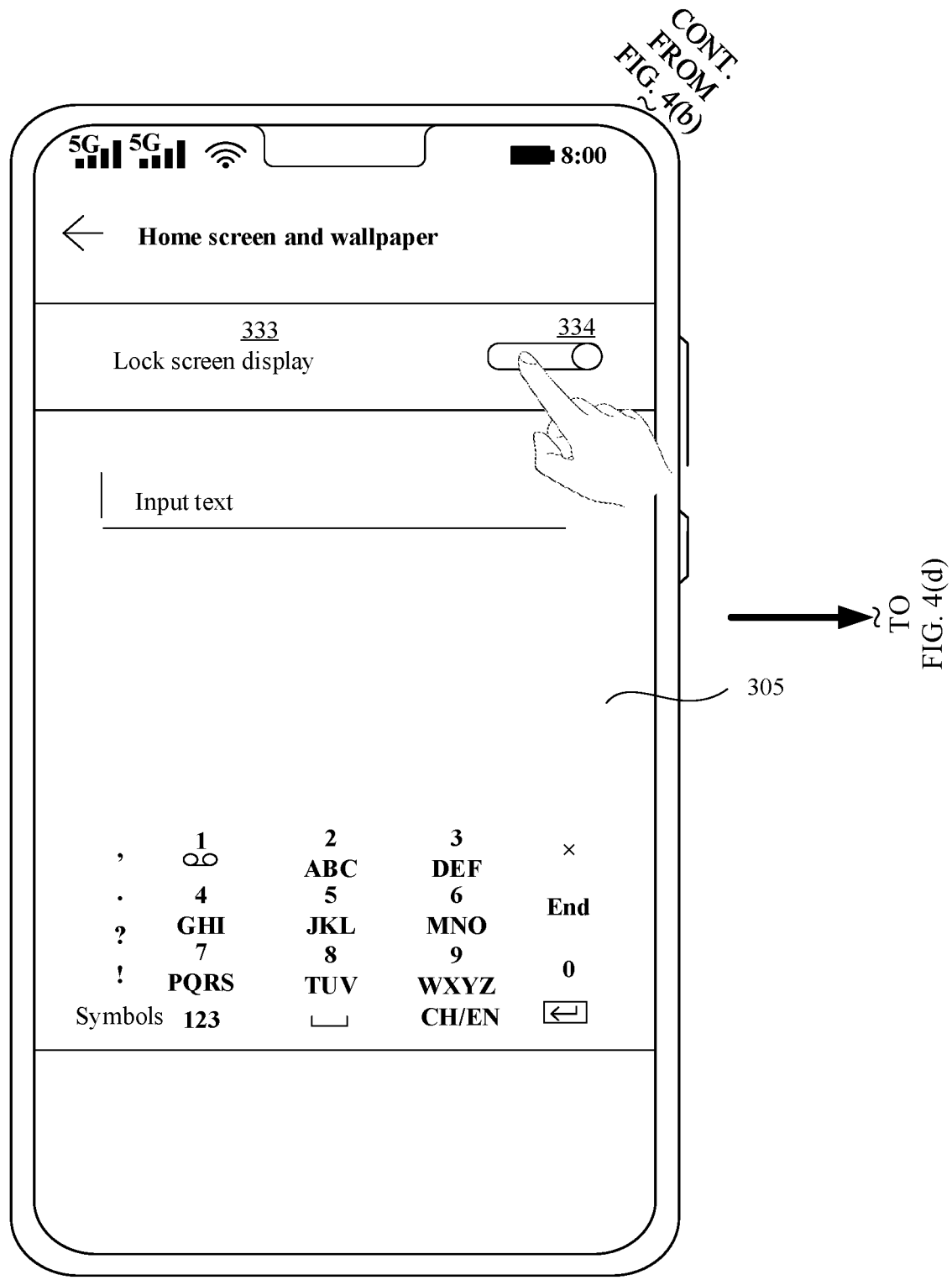

As shown in FIG. 4(b), after detecting an operation that the user taps an icon of the application Screen and wallpaper 321 in the system setting interface 303, the mobile phone starts the application Screen and wallpaper, and displays an interface shown in FIG. 4(c). The interface may be referred to as a setting interface 305 of a graffiti pattern. The setting interface 305 may include Lock screen display 333, a text input area, a keyboard area, and the like.

Figure 4D:
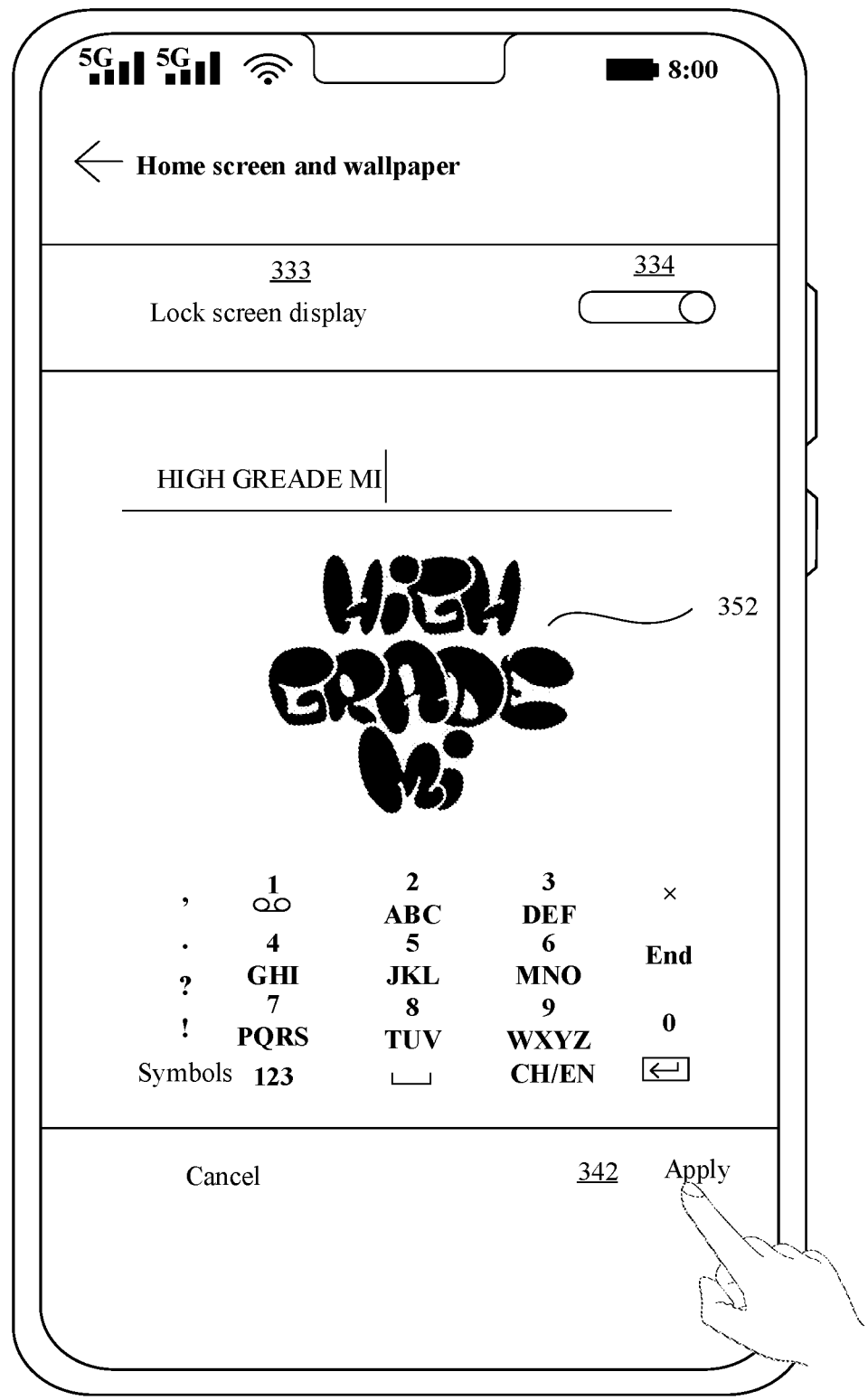
Figure 4A:
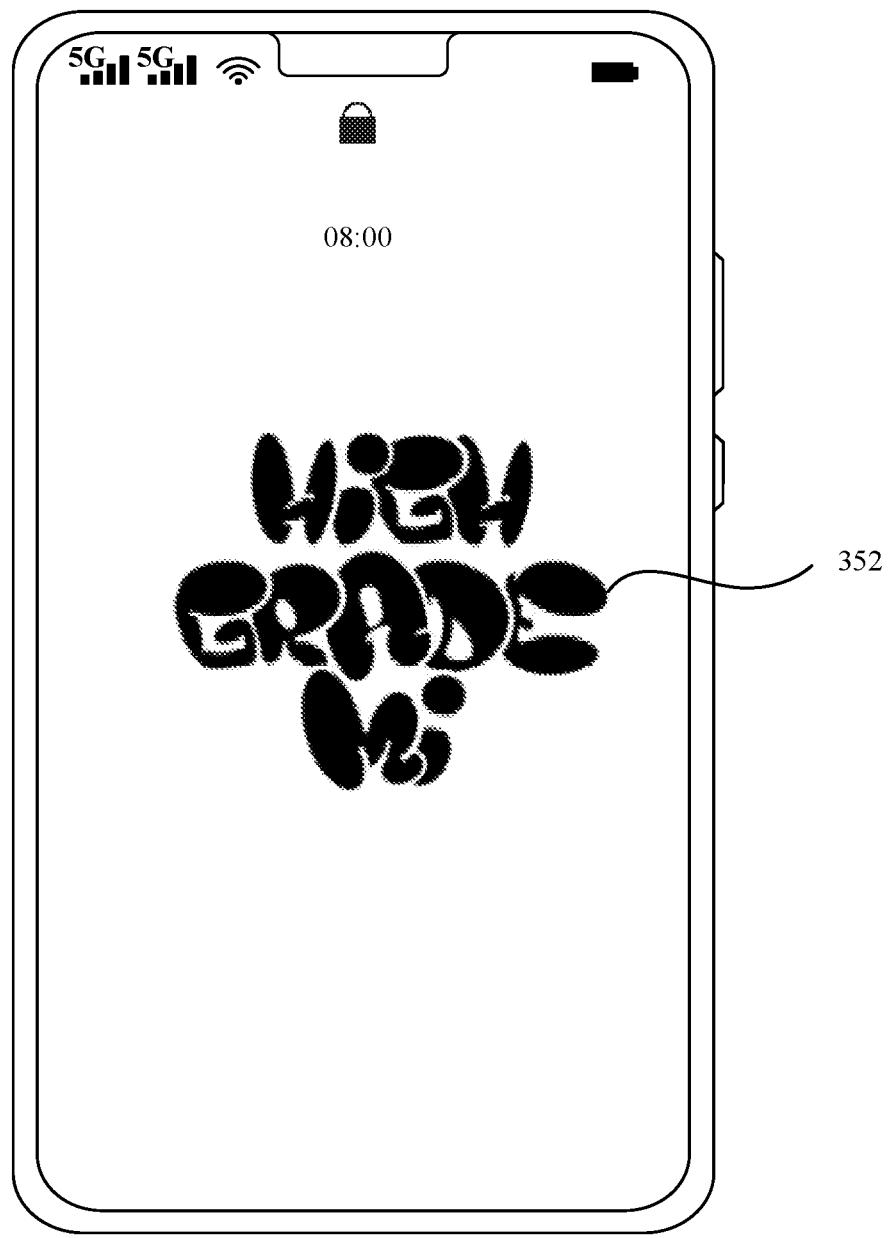

Lock screen display 333 is used to display a screen locking pattern in a screen-locked state of the mobile phone. As shown in FIG. 4(c), after the mobile phone detects an operation that the user taps a switch control 334 corresponding to an icon of Lock screen display 333 in the setting interface 305, the switch control 334 displays an on state, and the setting interface 305 displays the text display area and the keyboard area. The mobile phone receives text information entered by the user in the text input area. As shown in FIG. 4(d), after the mobile phone receives text information "HIGH GREAT MI" entered by the user, and detects that the user taps an icon of a control "End" in the keyboard area, the mobile phone retrieves a graffiti letter image associated with the text information in a font library, and performs combination processing on the graffiti letter image based on a sequence of the text information, to generate and display a graffiti pattern 352 corresponding to the text information. After detecting an operation that the user taps an icon of Apply 342 in the setting interface 305, the mobile phone applies the generated graffiti pattern 352 to an interface of Lock screen display.

For example, as shown in FIG. 4A, when the mobile phone switches to the screen-locked state, the graffiti pattern 352 is displayed. The graffiti pattern 352 displayed in FIG. 4(d) and FIG. 4A is merely described as an example, and a specific color of the graffiti pattern is not specifically limited.

It can be understood that the mobile phone transmits pixel drive voltage information of the generated graffiti pattern 352 to a display driver of Lock screen display, and the display driver drives, based on the pixel drive voltage information, a display panel of a screen of the mobile phone to display the graffiti pattern. When the switch control 334 of the application Lock screen display 333 is in the on state, not only the text input area and the keyboard area are displayed, but also an icon of a setting control for setting another screen locking pattern may be displayed, for example, an icon of an application control such as a lock screen signature and a magazine lock screen.

Scenario 3

FIG. 5(a), FIG. 5(b), FIG. 5(c), FIG. 5(d) and FIG. 5A are schematic diagrams of other user interfaces (graphical user interface, GUI) in which a graffiti pattern is generated according to an embodiment of this application.

Figure 5A:
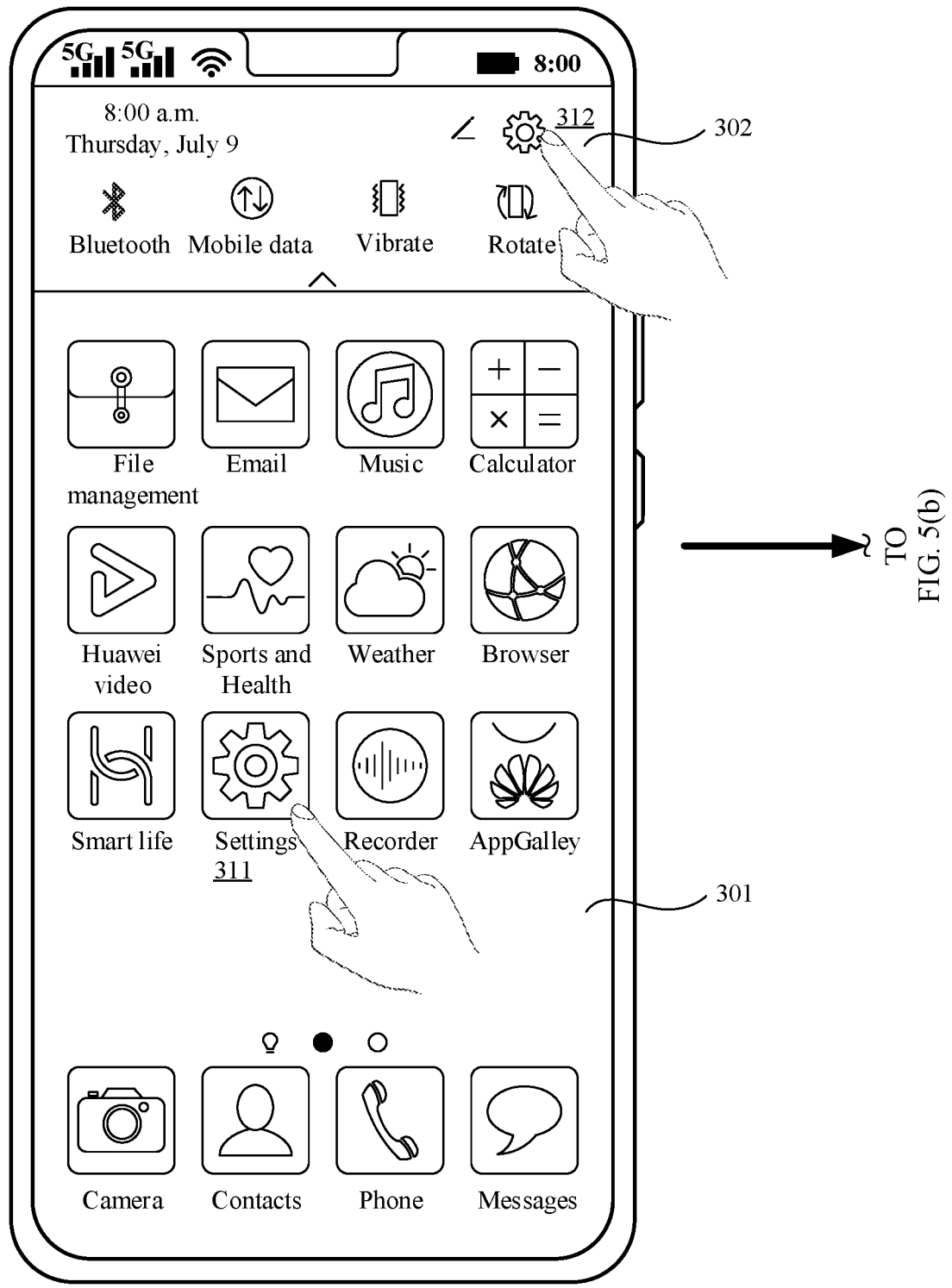
FIG. 5(a), FIG. 5(b), FIG. 5(c), FIG. 5(d), and FIG. 5A are schematic diagrams of other user interfaces in which a graffiti pattern is generated according to an embodiment of this application.

Herein, FIG. 5(a) is the same as FIG. 3(a) and FIG. 4(a), and shows that an on-screen display system of a mobile phone displays currently output interface content in an unlocked mode of the mobile phone. The interface content 301 is a home screen of the mobile phone. The interface content 301 displays a plurality of third-party applications (application, APP), for example, File management, Email, Music, Calculator, Settings 311, and Camera. In addition, the on-screen display system of the mobile phone further displays an interface of a drop-down list 302, and the interface of the drop-down list 302 may further include icons corresponding to controls such as Bluetooth, Mobile data, Vibrate, Rotate, and Settings 312.

Figure 5B:
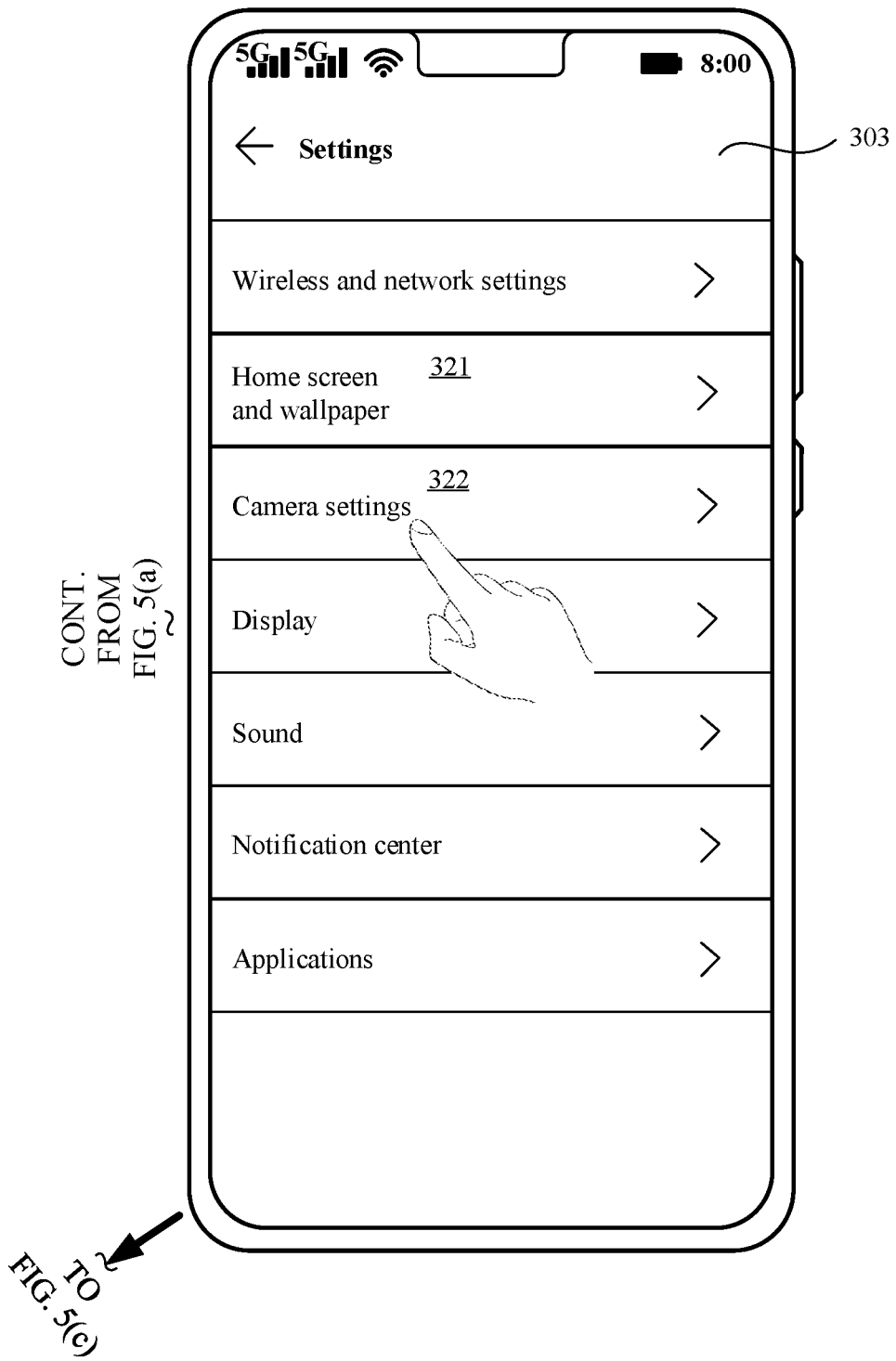

The same as FIG. 3(b) and FIG. 4(b), after detecting an operation that a user taps Settings 311 on the home screen or an icon of Settings 312 in the drop-down list 302 on a screen, the mobile phone may start a system setting application, to display an interface shown in FIG. 5(b). The interface may be a system setting interface 303, and the system setting interface 303 includes controls such as Wireless and network settings, Screen and wallpaper 321, and Camera settings 322.

Figure 5C:
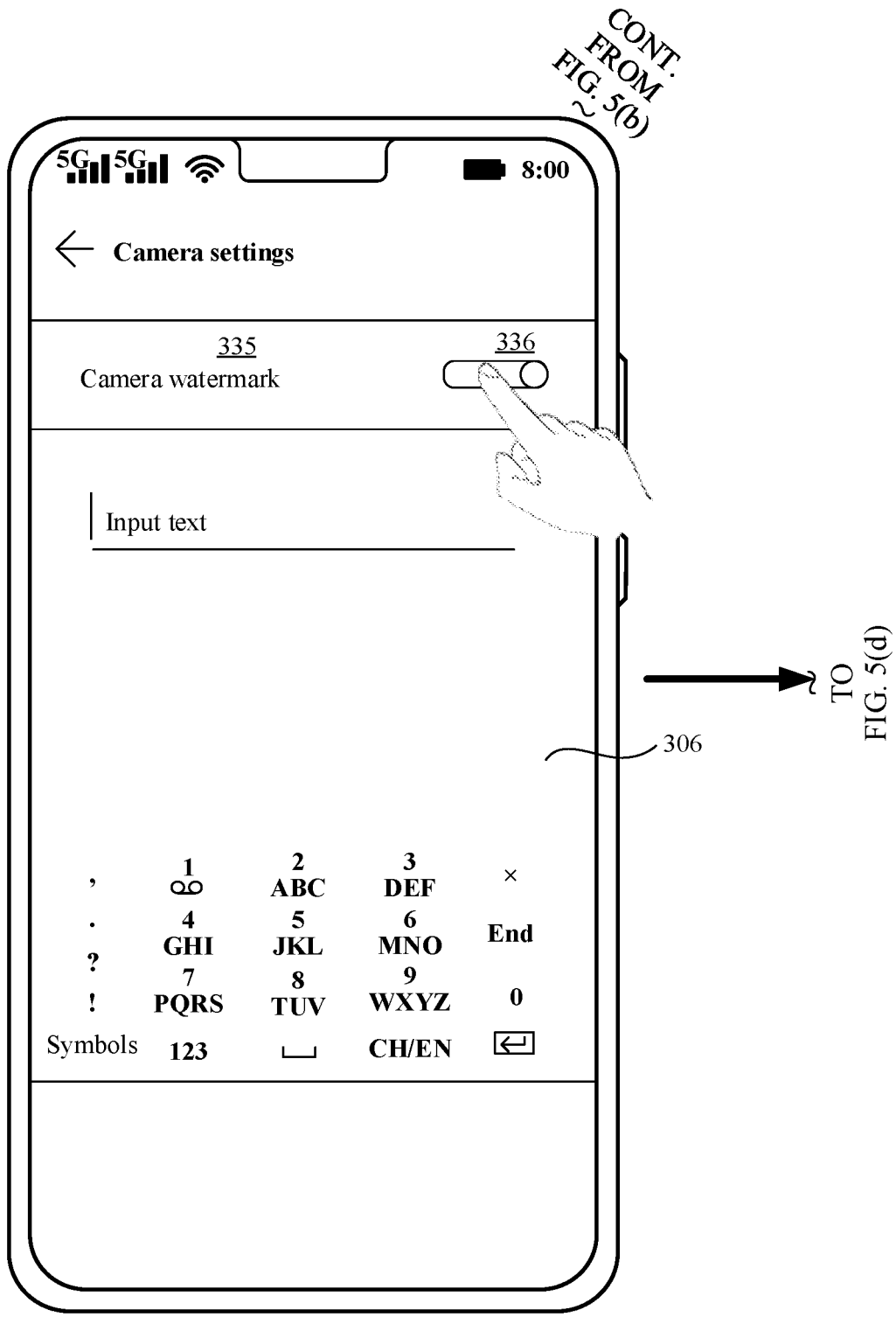

As shown in FIG. 5(b), after detecting an operation that the user taps an icon of the application Camera settings 322 in the system setting interface 303, the mobile phone starts the application Camera settings, and displays an interface shown in FIG. 5(c). The interface may be referred to as a setting interface 306 of a graffiti pattern. The setting interface 306 may include Camera watermark 335, a text input area, a keyboard area, and the like.

Figure 5D:
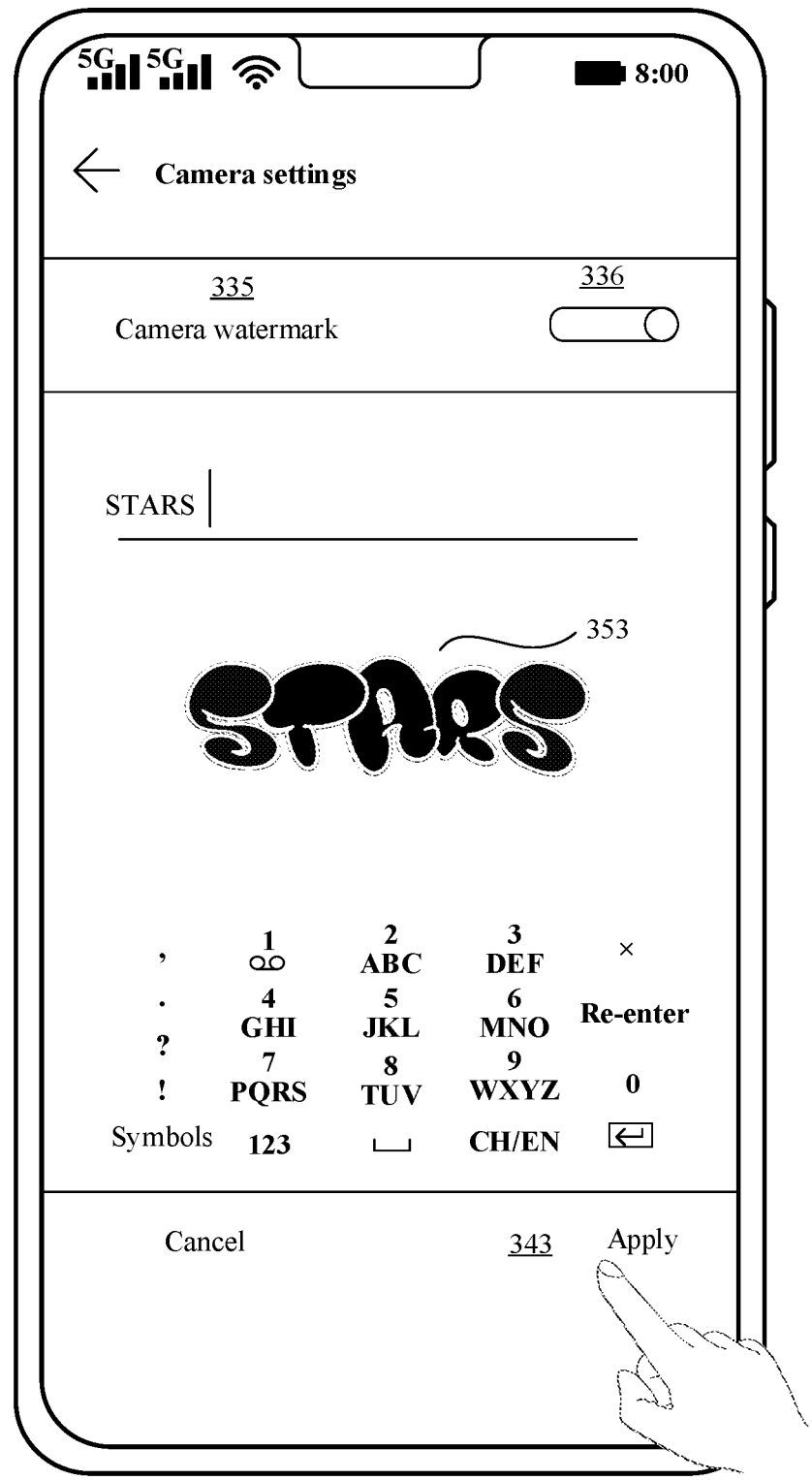
Figure 5A:
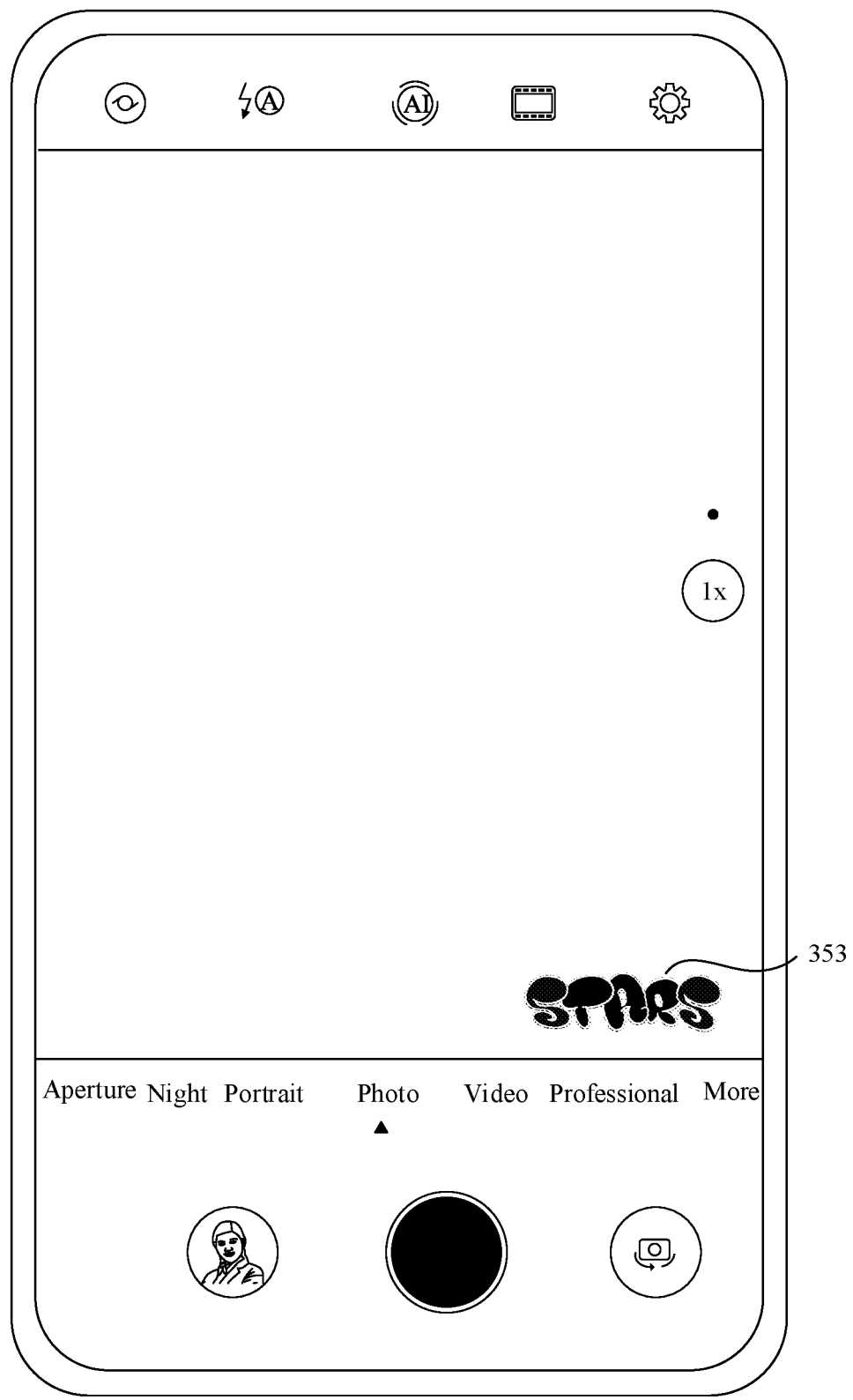

Camera watermark 333 is configured to display a corresponding watermark pattern in a photographing interface when the mobile phone starts a camera to perform photographing. As shown in FIG. 5(c), after the mobile phone detects an operation that the user taps a switch control 336 corresponding to an icon of Camera watermark 335 in the setting interface 306, the switch control 336 displays an on state, and the setting interface 306 displays the text display area and the keyboard area. The mobile phone receives text information entered by the user in the text input area. As shown in FIG. 5(d), after the mobile phone receives text information "STARS" entered by the user, and detects that the user taps an icon of a control "End" in the keyboard area, the mobile phone retrieves a graffiti letter image associated with the text information in a font library, and performs combination processing on the graffiti letter image based on a sequence of the text information, to generate and display a graffiti pattern 353 corresponding to the text information. After detecting an operation that the user taps an icon of Apply 343 in the setting interface 306, the mobile phone applies the generated graffiti pattern 353 to a camera photographing application scenario.

For example, as shown in FIG. 5A, when the mobile phone starts the camera to perform photographing, the graffiti pattern 353 may be displayed in a photographing interface. The graffiti pattern 353 displayed in FIG. 5(d) and FIG. 5A is merely described as an example, and a specific color of the graffiti pattern is not specifically limited. A location at which Camera watermark is displayed may be set based on a requirement. For example, in the camera photographing interface, Camera watermark 353 is directly dragged to any location in the photographing interface.

It can be understood that the mobile phone transmits pixel drive voltage information of the generated graffiti pattern 353 to a display driver of the camera photographing interface, and the display driver drives, based on the pixel drive voltage information, a display panel of a screen of the mobile phone to display the graffiti pattern 353. When the switch control 336 of the application Camera watermark 335 is in the on state, not only the text input area and the keyboard area are displayed, but also an icon of a setting control for setting another watermark pattern may be displayed.

Scenario 4

FIG. 6(a), FIG. 6(b), FIG. 6(c), and FIG. 6(d) are a schematic diagram of another user interface (graphical user interface, GUI) in which a graffiti pattern is generated according to an embodiment of this application.

A graffiti pattern generation method provided in an embodiment of this application may be further applied to an application (application, APP) that sets a graffiti pattern type. The application is downloaded on a mobile phone end, and a generated graffiti pattern is applied to different system application scenarios, for example, an application scenario of Always on display, an application scenario of Lock screen display, or an application scenario of Camera watermark display.

Figure 6A:
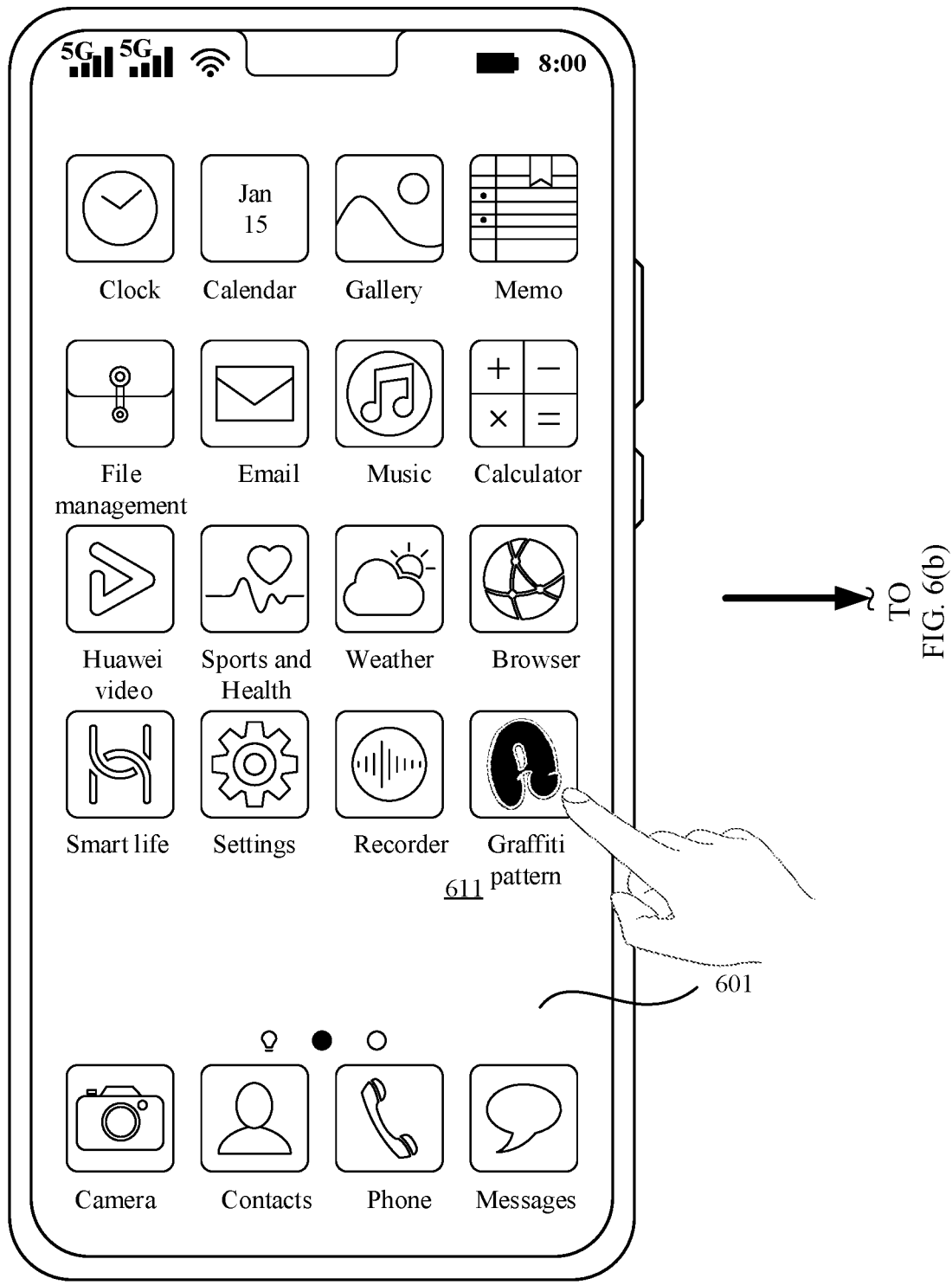
FIG. 6(a), FIG. 6(b), FIG. 6(c), and FIG. 6(d) are a schematic diagram of another user interface in which a graffiti pattern is generated according to an embodiment of this application.

FIG. 6(a) shows that an on-screen display system of a mobile phone displays currently output interface content in an unlocked mode of the mobile phone. The interface content 601 is a home screen of the mobile phone. The interface content 601 displays a plurality of third-party applications (application, APP) such as Clock, Calendar, Gallery, Memo, File management, Email, Music, Calculator, Settings, Camera, and Graffiti pattern 611. It should be understood that the interface content may further include more other applications. This is not limited in this application.

Figure 6B:
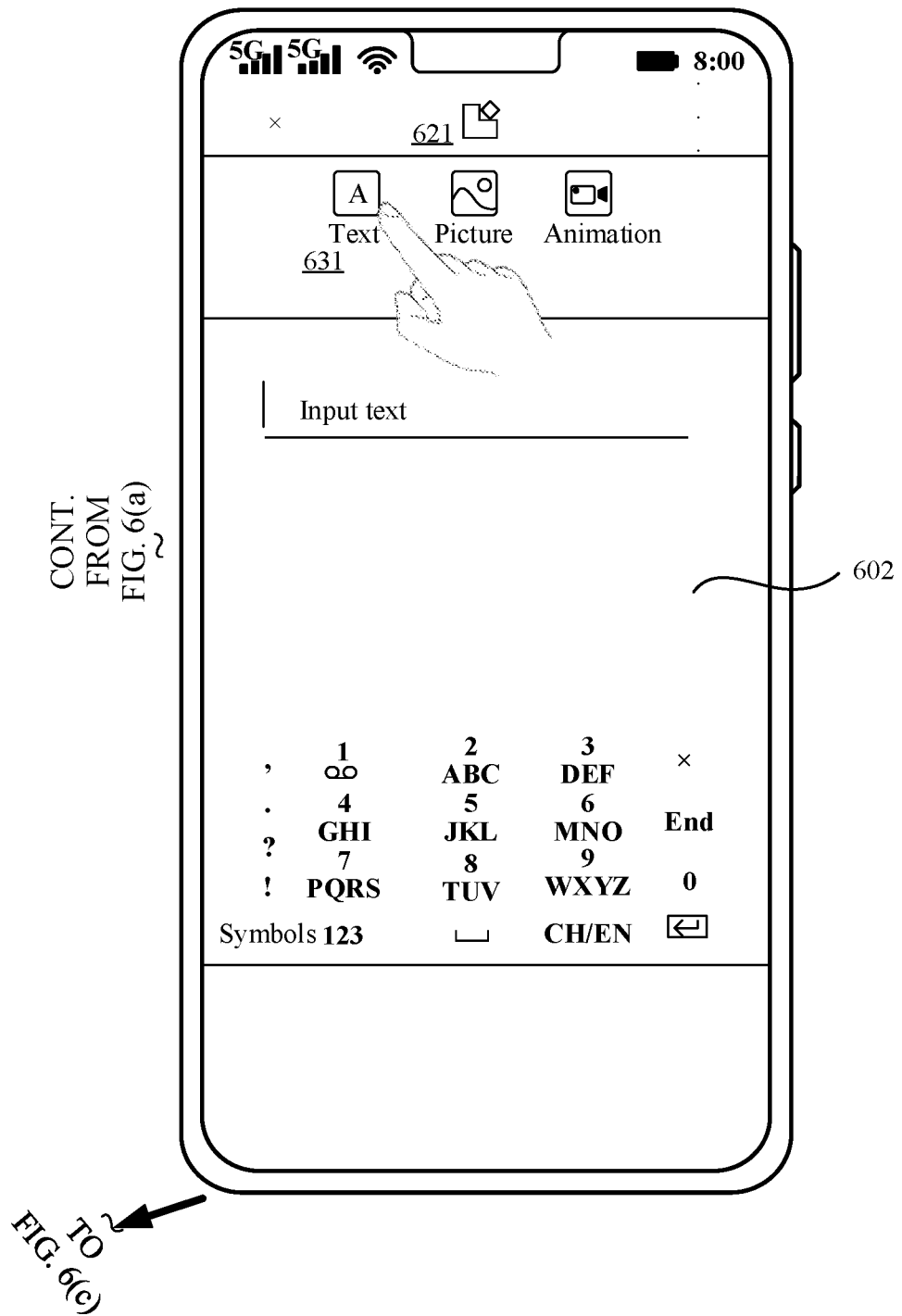
Figure 6C:
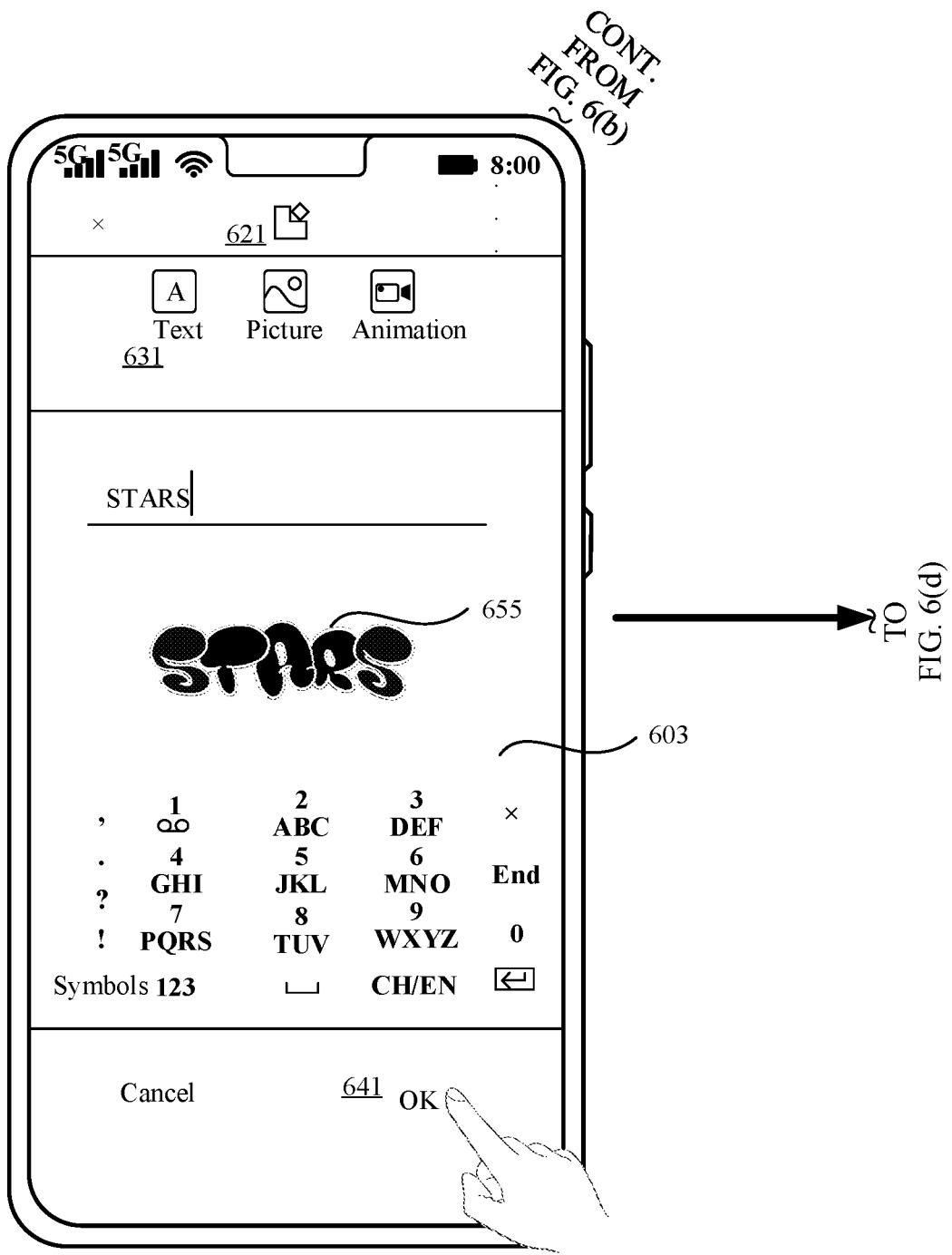
Figure 6D:
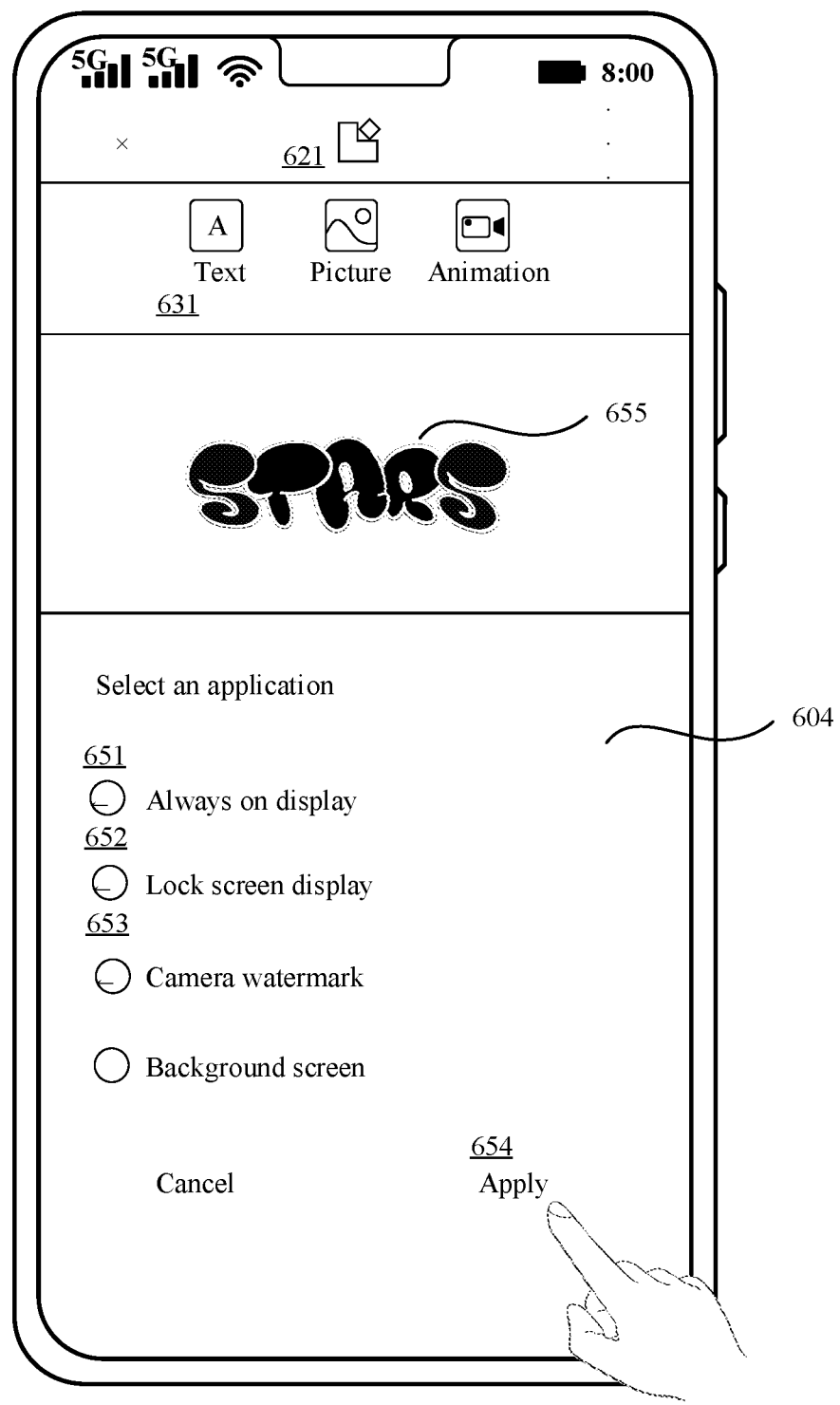

After detecting an operation that the user taps an icon of Graffiti pattern 611 on the home screen, the mobile phone may start the application Graffiti pattern, and display an interface shown in FIG. 6(b). The interface may be referred to as a setting interface 602 of a graffiti pattern. The setting interface 602 may include a function item 621. After detecting an operation that the user taps an icon of the function item 621 in the setting interface 602, the mobile phone displays icons of controls such as Text 631, Picture, and Animation in the setting interface. It should be understood that, after detecting the operation that the user taps the icon of the function item 621 in the setting interface 602, the mobile phone can further display more icons of other controls. This may be specifically set based on a function of an application. This is not limited in this application.

After detecting an operation that the user taps an icon of Text in the setting interface 602, the mobile phone displays the text input area and the keyboard area in response to a tap operation of the user. The mobile phone receives text information entered by the user in the text input area. As shown in FIG. 6(*c*), after the mobile phone receives text information "STARS" entered by the user, and detects that the user taps an icon of a control "End" in the keyboard area, the mobile phone retrieves a graffiti letter image associated with the text information in a font library, and performs combination processing on the graffiti letter image based on a sequence of the text information, to generate and display a graffiti pattern 353 corresponding to the text information. After detecting an operation that the user taps an icon of OK 641 in an interface 603, the mobile phone displays a control icon for selecting an application scenario. As shown in FIG. 6(*d*), the interface 604 displays control icons of various application scenarios such as icons of application scenarios of Always on display 651, Lock screen display 652, Camera watermark 653, and Background screen.

After the mobile phone detects an operation that the user taps icons of Always on display 651, Lock screen display 652, and Camera watermark 653 in the interface 604, the icons of Always on display 651, Lock screen display 652, and Camera watermark 653 are displayed in a selected state. After detecting an operation that the user taps an icon of an application 645 in the interface 604, the mobile phone applies a generated graffiti pattern 655 to Always on display, Lock screen display, and a camera photographing application scenario.

For example, the same as FIG. 3A, FIG. 4A, and FIG. 5A, the graffiti pattern 655 may be further displayed when the mobile phone switches to a screen-off state; the graffiti pattern 655 may be further displayed when the mobile phone switches to the screen-locked state; and a watermark of the graffiti pattern 655 may be further displayed in a photographing interface when the mobile phone starts a camera to perform photographing.

The graffiti pattern 655 displayed in FIG. 6(*c*) and FIG. 6(*d*) is merely described as an example, and a specific color of the graffiti pattern is not specifically limited. In a screen-off application scenario, a driving manner of a drive voltage is set, to further dynamically display the graffiti pattern in different areas of a display panel. In a camera photographing application scenario of camera photographing, a location at which Camera watermark is displayed may be set based on a requirement. For example, in the photographing interface of the camera, Camera watermark 655 is directly dragged to any location in the photographing interface.

It can be understood that, regardless of a function of an application of the mobile phone, a function plug-in of an application, or a system application embedded in a system of the mobile phone, according to the graffiti pattern generation method provided in this embodiment of this application, different graffiti fonts or graffiti images may be developed based on a market requirement. A function of setting or displaying a corresponding application scenario in the electronic device is implemented based on a similar design principle.

It should be further understood that letter text information and the graffiti letter image used in embodiments of the foregoing application scenario do not limit this application. Based on a similar design concept, the text information and a graffiti image associated with the text information may alternatively be content in another form or shape. For example, if a corresponding font library or gallery is provided, a required graffiti pattern may be generated correspondingly based on content of entered text information.

The following specifically describes a process of performing combination processing on the graffiti letter image corresponding to the text information entered by the user, to obtain the graffiti pattern. After receiving the text information, the mobile phone obtains the graffiti letter image associated with the text information. The mobile phone performs combination processing on the graffiti letter image based on an attribute feature of the graffiti letter image, to obtain the graffiti pattern.

Figure 15:
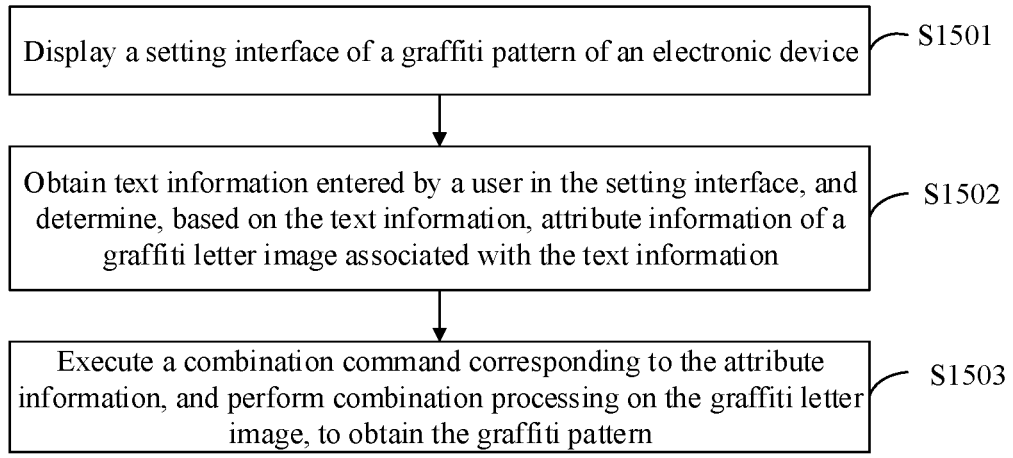
FIG. 15 is a schematic flowchart of a graffiti pattern generation method according to an embodiment of this application.

FIG. 15 is a schematic flowchart of a graffiti pattern generation method according to an embodiment of this application. The method may be implemented in an electronic device (for example, a mobile phone or a smartwatch) shown in FIG. 1 and FIG. 2. As shown in FIG. 15, the method includes the following steps:

Step S1501: Display a setting interface of a graffiti pattern of the electronic device.

For example, the electronic device may be a device such as a mobile phone or a smartwatch.

For example, corresponding to different application scenarios, there are different setting interfaces of the graffiti pattern such as a setting interface 304 shown in FIG. 3(*c*), a setting interface 305 shown in FIG. 4(*c*) a setting interface 306 shown in FIG. 5(*c*), and a setting interface 602 shown in FIG. 6(*b*).

For example, the setting interface includes a text input area and a keyboard area. The text input area is configured to receive text information entered by a user.

It can be understood that, different setting interfaces include different icons of application controls. The mobile phone detects an operation that the user taps the icon, and in response to a tap operation of the user, and jumps to a corresponding interface or performs a corresponding image processing operation.

Step S1502: Obtain text information entered by the user in the setting interface, and determine, based on the text information, attribute information of a graffiti letter image associated with the text information.

For example, the text information includes letter or text information. When the text information is a plurality of letters, whether the plurality of entered letters are capital or small letters may not be limited. Each letter in the text information is associated with a corresponding graffiti letter image in a font library or gallery, and a corresponding required graffiti letter image may be determined based on content of the text information.

Figure 7:
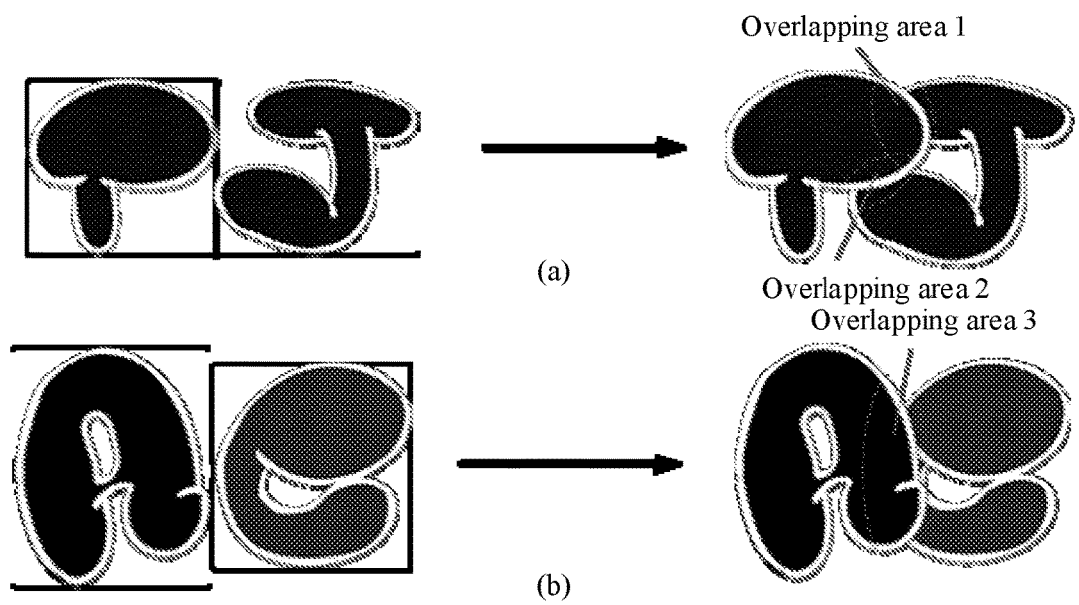
FIG. 7 is a schematic diagram of another effect of processing a graffiti letter image according to an embodiment of this application.

The attribute information of the graffiti letter image includes a ratio of an overlapping area. FIG. 7 is a schematic diagram of an effect of a graffiti letter image according to an embodiment of this application. The ratio of the overlapping area is a ratio of a quantity of opaque pixels in an overlapping area 1 and an overlapping area 2 shown in (a) in FIG. 7 or a quantity of opaque pixels in an overlapping area 3 shown in (b) in FIG. 7 to a total quantity of all opaque pixels in two adjacent graffiti letter images.

Figure 8:
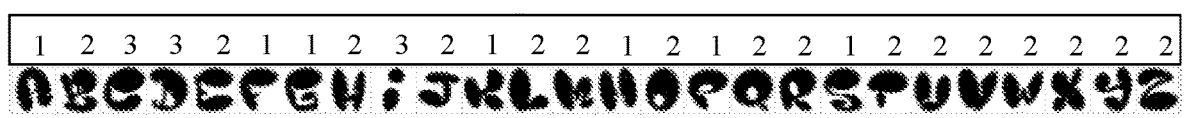
FIG. 8 is a schematic diagram of an effect of a graffiti letter image in a font library according to an embodiment of this application.

The attribute information includes tilt angle information of each graffiti letter image. FIG. 8 is a schematic diagram of an effect of a graffiti letter image according to an embodiment of this application. Graffiti letter images in the font library correspond to different tilt angles.

For example, each letter in the font library may or may not have a tilt angle. As shown in FIG. 8, a letter with a corresponding mark "1" is tilted to the left, a letter with a corresponding mark "2" is not tilted, and a letter with a corresponding mark "3" is tilted to the right.

Figure 10:
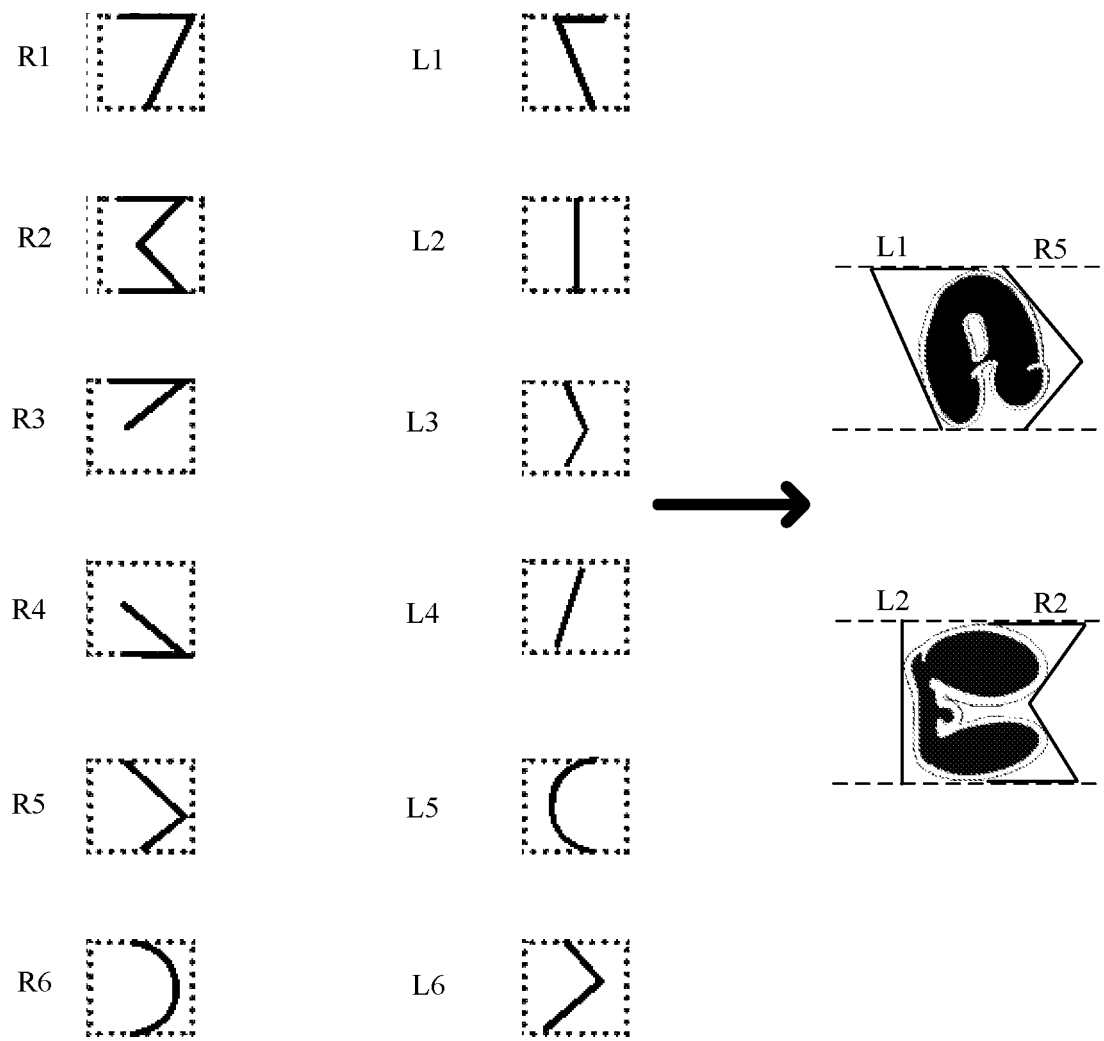
FIG. 10 is a schematic diagram of an effect of a graffiti letter image according to an embodiment of this application.

The attribute information of the graffiti letter image further includes left edge information and right edge information. FIG. 10 is a schematic diagram of an effect of a graffiti letter image according to an embodiment of this application. The graffiti letter image may be an image displayed corresponding to a letter in the font library, and a font library or gallery of a required version may be downloaded by a mobile phone end based on an application scenario.

As shown in FIG. 10, right edge information of a graffiti letter image in the font library may include edge information in six shapes: R1, R2, R3, R4, R5, and R6, and left edge information may include edge information in six shapes: L1, L2, L3, L4, L5, and L6. Specific forms are shown in FIG. 10.

For example, a shape of a letter "A" in the font library is classified as a shape L1 in the left edge information, and is classified as a shape R5 in the right edge information, and a shape of a letter "E" in the font library is classified as a shape L2 in the left edge information, and is classified as a shape R2 in the right edge information.

It can be understood that shapes of the left edge information and right edge information of the graffiti letter image are not limited to the foregoing shapes, and may be determined based on features of the graffiti letter image in the font library.

Figure 11:
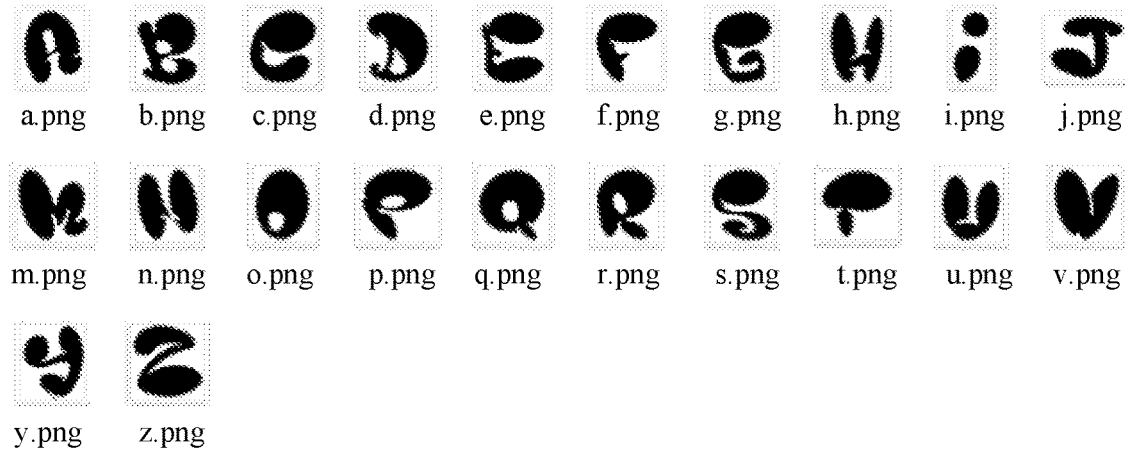
FIG. 11 is a schematic diagram of an effect of a graffiti letter image in a font library according to an embodiment of this application.
Figure 11:

FIG. 11 is a schematic diagram of an effect of a graffiti letter image in a font library according to an embodiment of this application. The font library may include graffiti shapes of 26 English letters, as shown in (a) in FIG. 11. Left edge information and right edge information of each letter correspond to different shapes, as shown in FIG. 11 (b). L represents the left edge information, and R represents the right edge information. As shown in FIG. 10, a left side shape and a right side shape corresponding to the graffiti letter image "A" are respectively L1 and R5, a left side shape and a right side shape corresponding to the graffiti letter image "B" are respectively L1 and R2, and a left side shape and a right side shape corresponding to the graffiti letter image "C" are respectively L5 and R2. By analogy, a left side shape and a right side shape of another graffiti letter image shown in (b) in FIG. 11 are obtained.

It should be understood that the font library or gallery may be designed based on a requirement. For a preset gallery or font library, the left edge information and the right edge information of the graffiti letter image may be preset information associated with the graffiti letter image, and the electronic device may directly invoke the left edge information and the right edge information based on the graffiti letter image. In addition, for the preset picture library or font library, the electronic device may alternatively determine the left edge information and the right edge information of the graffiti letter image by identifying coordinates of an opaque pixel on a left edge of the graffiti letter image and coordinates of an opaque pixel on a right edge of the graffiti letter image. In other words, the left edge information and the right edge information of the graffiti letter image may be a preset association relationship with the graffiti letter image, or may be information determined in real time based on the graffiti letter image.

Step S1503: Execute a combination command corresponding to the attribute information, and perform combination processing on the graffiti letter image, to obtain the graffiti pattern.

In a possible implementation, the attribute information includes a ratio of an overlapping area between a first graffiti letter image and a second graffiti letter image, and if the text information is associated with a plurality of graffiti letter images, the executing a combination command corresponding to the attribute information, and performing combination processing on the graffiti letter image includes:

obtaining a first total quantity of opaque pixels in the first graffiti letter image and opaque pixels in the second graffiti letter image; obtaining a second total quantity of opaque pixels in the overlapping area between the first graffiti letter image and the second graffiti letter image, where the opaque pixel in the overlapping area is an opaque pixel in both of the first graffiti letter image and the second graffiti letter image; and using a ratio of the second total quantity to the first total quantity as the ratio of the overlapping area, and performing combination processing on the first graffiti letter image and the second graffiti letter image based on the ratio of the overlapping area if the ratio of the overlapping area meets a preset threshold, where the first graffiti letter image and the second graffiti letter image are two adjacent images in the plurality of graffiti letter images.

For example, to ensure a balance between overlapping areas in two adjacent graffiti letter images, FIG. 7 is a schematic diagram of an effect of processing a graffiti letter image according to an embodiment of this application. When graffiti letter images "T" and "J" are combined as shown in (a) in FIG. 7, or when graffiti letter images "A" and "C" are combined as shown in (b) in FIG. 7, a ratio of a quantity of opaque pixels in an overlapping area between any two letters, namely, a left letter and a right letter to a quantity of all opaque pixels of the any two letters, namely, the left letter and the right letter is defined as the ratio rate of the overlapping area. The ratio rate of the overlapping area is a fixed value, and may be represented based on Formula 1:

$$\text{rate} = \frac{overLapOpaqueNum}{leftOpaqueNum + rightOpaqueNum}$$

The ratio rate of the overlapping area rate is a fixed value (for example, is set to 10%); overlapOpaqueNum is a quantity of opaque pixels in an overlapping area between any two adjacent graffiti letter images, namely, a left graffiti letter image and a right graffiti letter image, namely, the second total quantity, the quantity of the opaque pixels in the overlapping area 1 and the overlapping area 2 shown in (a) in FIG. 7, or the quantity of the opaque pixels in the overlapping area 3 shown in (b) in FIG. 7; leftOpaqueNum is a quantity of all opaque pixels of a left graffiti letter image; rightOpaqueNum is a quantity of all opaque pixels of a right graffiti letter image; and a sum of the quantity of all the opaque pixels of the left graffiti letter image and the quantity of all the opaque pixels of the right graffiti letter image, namely, leftOpaqueNum+rightOpaqueNum, is used as the first total quantity.

For example, a quantity of opaque pixels included in each of two adjacent graffiti letter images may be determined by traversing opaque pixels of a graffiti letter image. For example, if an initial value of leftOpaqueNum is 0, all pixels of the left graffiti letter image are traversed, and if transparency of the pixel is greater than 0, leftOpaqueNum=leftOpaqueNum+1. Similarly, if the initial value of rightOpaqueNum is 0, all pixels of the right graffiti letter image are traversed, and if transparency of the pixel is greater than 0, rightOpaqueNum=rightOpaqueNum+1.

A step step (count count=0) is set, the overlapping area is increased by one step step (count=count+1) each time, and a quantity of opaque pixels in both the left graffiti letter image and the right graffiti letter image in the overlapping area (in other words, a pixel location at which both the left graffiti letter image and the right graffiti letter image are opaque pixels) is calculated.

If overlapOpaqueNum/rate<leftOpaqueNum+rightOpaqueNum, the overlapping area is further increased by one step step (count=count+1), and the quantity of opaque pixels in the overlapping area continues to be counted. If overlapOpaqueNum/rate≥leftOpaqueNum+rightOpaqueNum, the overlapping area stops being increased by a step. Further, a total length of steps corresponding to the overlapping area is calculated based on a result of step*count.

One step step may be set to a specific quantity of pixels, and may be specifically set based on a quantity of pixels of an image. For example, 100 pixels correspond to one step. Alternatively, a specific length may be set. For example, one step is 1 millimeter. This is not specifically limited herein. The ratio of the overlapping area may be a preset fixed value, for example, set to 10%, or may be set based on a quantity of opaque pixels of two adjacent graffiti letter images. This is not specifically limited herein.

As shown in (a) in FIG. 7, in a process of combining "T" and "J", a combination manner of the graffiti letter images is finally determined based on a ratio of an overlapping area corresponding to an opaque pixel in the overlapping area 1 and the overlapping area 2 (namely, the total length that is of the steps corresponding to the overlapping area and that is obtained based on the result of step*count). As shown in (b) in FIG. 7, in a process of combining "A" and "C", a combination manner is finally determined based on a ratio of an overlapping area of the opaque pixels in the overlapping area 3.

It can be understood that the foregoing combination processing manner is merely used as an example for description, and does not limit a scope of this application. Another combination manner based on a same concept is also applicable.

In a possible implementation, if the first graffiti letter image is located on a left side of the second graffiti letter image, an overlapping relationship of the overlapping area is that a first layer is located on a previous layer of a second layer, the first layer is a layer at which the first graffiti letter image is located, and the second layer is a layer at which the second graffiti letter image is located.

It should be understood that, in this embodiment provided in this application, how to perform combination processing on the graffiti letter image is described. A trigger manner of invoking the graffiti letter image in the font library or gallery is not limited to invoking performed based on an association relationship between entered text information and a graffiti letter. Alternatively, each graffiti letter image may be directly displayed on a setting interface. After detecting an operation that the user taps an icon of a corresponding graffiti letter image, the mobile phone directly invokes the graffiti letter image, and performs combination processing on the graffiti letter image based on an attribute feature of the graffiti letter image.

For example, the attribute information may include the left edge information and the right edge information of the graffiti letter image corresponding to the text information, and may further include tilt angle information of the graffiti letter image. The combination command includes a spacing combination command and an angle combination command. The spacing combination command is used to determine a spacing between two adjacent graffiti letter images, and the angle combination command is used to determine a tilt angle of each graffiti letter image forming the graffiti pattern at a location in the graffiti pattern.

In a possible implementation, when the attribute information is the tilt angle information of each graffiti letter image, and the combination command is the angle combination command, if the text information is associated with a plurality of graffiti letter images, the executing a combination command corresponding to the attribute information, and performing combination processing on the graffiti letter image includes:

executing, based on an association relationship between the tilt angle information of the graffiti letter image and location information of the graffiti letter image in the plurality of graffiti letter images, the angle combination command corresponding to the association relationship, and adjusting an angle of the graffiti letter image based on the tilt angle information corresponding to the location information.

For example, as shown in FIG. 8, the graffiti letter images in the font library respectively correspond to different tilt angles. To ensure an aggregation degree of the finally generated graffiti pattern, when the text information is associated with the plurality of graffiti letter images, the angle of the graffiti letter image needs to be adjusted based on a location of the graffiti letter image. Table 1 shows a correspondence between location information and angle information.

TABLE 1

| | Location | | | |
|---|---|---|---|---|
| Angle | First on the left | Second on the left | Second on the right | First on the right |
| Tilt leftward | 0 | −5 | −10 | −20 |
| Not tilt | −10 | −5 | 5 | 10 |
| Tilt rightward | 20 | 10 | 5 | 0 |

It can be understood that the angle in Table 1 is an existing angle of the graffiti letter image in the font library or gallery, including "Tilt leftward", "Not tilt", and "Tilt rightward", that is, the angle information of the graffiti letter image. A location in Table 1 is a location of a character corresponding to a graffiti letter image in text information, and includes "First on the left" ("S" in FIG. 9), "Second on the left" ("T" in FIG. 9), "Second on the right" ("R" in FIG. 9), and "First on the right" ("S" in FIG. 9). When the graffiti letter image tilts leftward and is located at the location "First on the left", an angle is not adjusted. For example, "S" on the leftmost in FIG. 9 tilts leftward and is located at "First on the left", the angle is not adjusted. When the graffiti letter image does not tilt and is located at the location "Second on the left", the graffiti letter image is adjusted leftward by five degrees. For example, "T" in FIG. 9 does not tilt and is located at the location "Second on the left", as shown in Table 1, the graffiti letter image is adjusted leftward by five degrees. When the graffiti letter image tilts leftward and is located at the location "First on the right", the graffiti letter image is adjusted leftward by 20 degrees. For example, "S" on the rightmost in FIG. 9 tilts leftward and is located at the location "First on the right", as shown in Table 1, the graffiti letter image is adjusted leftward by 20 degrees. When the graffiti letter image does not tilt and is located at the location "Second on the right", the graffiti letter image is adjusted rightward by five degrees. For example, "R" in FIG. 9 does not tilt and is located at the location "Second on the right", as shown in Table 1, the graffiti letter image is adjusted rightward by five degrees.

Figure 9:
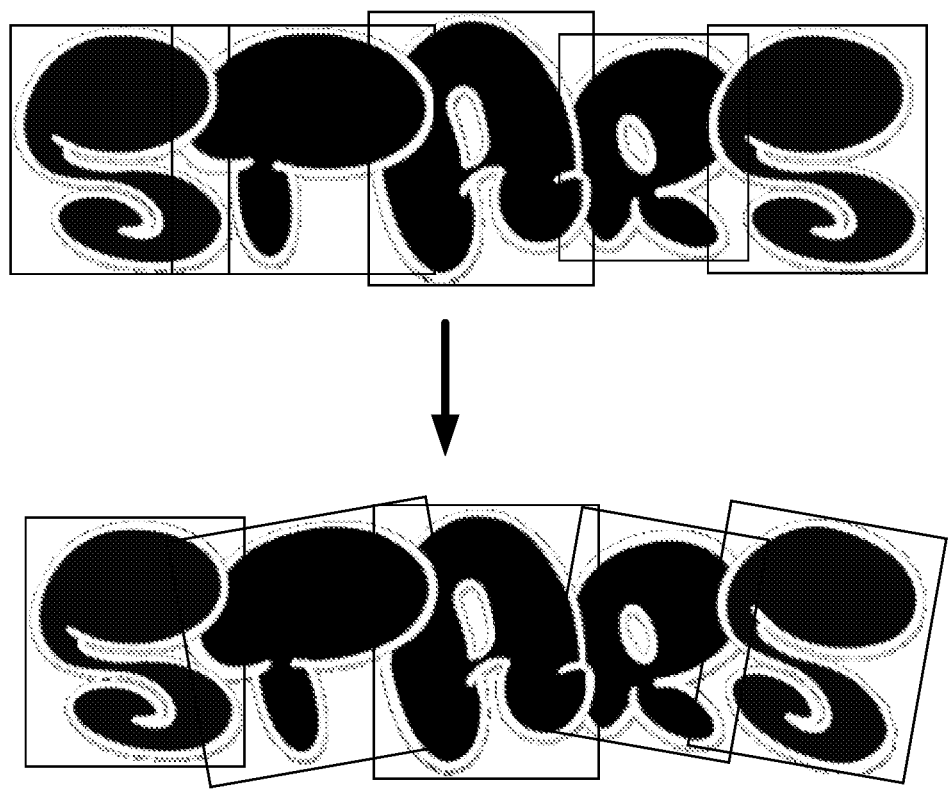
FIG. 9 is a schematic diagram of another effect of processing a graffiti letter image according to an embodiment of this application.

When a same letter is located at different locations, the letter corresponds to different tilt angles, for example, "S" on the leftmost and "S" on the rightmost in FIG. 9.

In a possible implementation, when the attribute information is the left edge information and the right edge information of the graffiti letter image corresponding to the text information, and the combination command is the spacing combination command, if the text information is associated with a plurality of graffiti letter images, the executing a combination command corresponding to the attribute information, and performing combination processing on the graffiti letter image includes:

executing, based on a combination pair of right edge information of a first graffiti letter image and left edge information of a second graffiti letter image, the spacing combination command corresponding to the combination pair, and performing combination processing on the first graffiti letter image and the second graffiti letter image based on a preset spacing.

The first graffiti letter image and the second graffiti letter image are two adjacent images in the plurality of graffiti letter images, the first graffiti letter image is located on a left side of the second graffiti letter image, the left edge information and the right edge information are respectively used to represent shape information of a left edge and a right edge of the graffiti letter image.

For example, with reference to shapes of left edges and right edges of all letters in the font library, left edge information or right edge information of two graffiti letter images may be combined. To be specific, right edge information of a left graffiti letter image and left edge information of a right graffiti letter image in two adjacent graffiti letter images are combined, to form a combination pair. A spacing combination command corresponding to the combination pair is set based on an edge shape feature of the combination pair. When the mobile phone detects that a combination pair of any two adjacent graffiti letter images satisfies a shape combination in the combination pair, the mobile phone executes the spacing combination command corresponding to the combination pair, to combine the two adjacent graffiti letter images based on the corresponding preset spacing. Table 2 shows a correspondence between a combination pair and a combination spacing.

TABLE 2

| Combination pair | Combination spacing |
|---|---|
| R1L1 | 24 |
| R2L1 | 24 |
| R3L1 | 24 |
| R4L1 | 30 |
| R5L1 | 14 |
| R6L1 | 14 |
| R1L2 | 16 |
| R2L2 | 16 |
| R3L2 | 16 |

TABLE 2-continued

| Combination pair | Combination spacing |
|---|---|
| R4L2 | 23 |
| R5L2 | 16 |
| R6L2 | 16 |
| R1L3 | 18 |
| R2L3 | 18 |
| R3L3 | 18 |
| R4L3 | 18 |
| R5L3 | 25 |
| R6L3 | 16 |
| R1L4 | 26 |
| R2L4 | 20 |
| R3L4 | 26 |
| R4L4 | 20 |
| R5L4 | 16 |
| R6L4 | 22 |
| R1L5 | 28 |
| R2L5 | 28 |
| R3L5 | 28 |
| R4L5 | 28 |
| R5L5 | 16 |
| R6L5 | 16 |
| R1L6 | 36 |
| R2L6 | 36 |
| R3L6 | 53 |
| R4L6 | 36 |
| R5L6 | 28 |
| R6L6 | 36 |

It should be understood that, in two adjacent graffiti letter images, a combination pair is obtained by combining right edge information of a left graffiti letter image and left edge information of a right graffiti letter image. Table 2 describes only an example of a combination spacing corresponding to a combination pair of a font library shown in (a) in FIG. 10, and is not used to limit this application. For a font library or gallery of other shapes, another combination pair and a combination spacing associated with a graffiti letter image in the font library or gallery may be further preset. The electronic device may invoke, based on a combination pair of graffiti letter images, a spacing combination command corresponding to the combination pair, and execute the spacing combination command, to perform combination processing on a graffiti letter.

Figure 12:
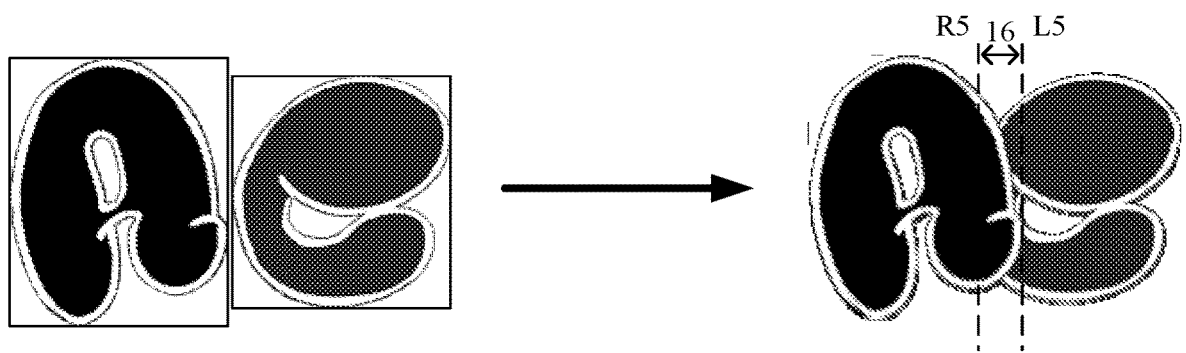
FIG. 12 is a schematic diagram of another effect of processing a graffiti letter image according to an embodiment of this application.

For example, FIG. 12 is a schematic diagram of an effect of processing a graffiti letter image according to an embodiment of this application. When the text information is "AC", the mobile phone recognizes edge information of graffiti letter images respectively corresponding to "AC", to be specific, right edge information of "A" and left edge information of "C", and may determine that a right side shape of "A" is R5 and a left side shape of "C" is L5. Based on Table 2, if the combination pair is R5L5, and a combination spacing corresponding to R5L5 is 16, the combination command is executed, to combine, based on a spacing of 16, graffiti letter images (namely, a font image in the font library) respectively corresponding to "A" and "C", so as to obtain a combination effect shown in FIG. 12.

It can be understood that a spacing value may be a quantization value, and a specific quantity of pixel values are used as a quantization value in one unit. A unit of a spacing value in Table 2 corresponds to a quantization value. For example, if a distance of 50 pixels is used as a unit of quantization value, the spacing value is 16, and corresponds to a distance of 16×50 pixels. A unit of the spacing value in Table 2 may also be a unit of length, for example, millimeter mm.

In a possible implementation, the graffiti pattern generation method further includes:

obtaining pixel coordinates of an opaque pixel on each of the left edge and the right edge of the graffiti letter image; and determining the left edge information and the right edge information of each graffiti letter image based on the pixel coordinates.

For example, for a font library or gallery in which the left edge information and the right edge information associated with the graffiti letter image are not preset, the left edge information and the right edge information of the graffiti letter image may be further determined based on coordinates of opaque pixels on the left edge and the right edge of the graffiti letter image. After determining the associated graffiti letter image based on the text information, the electronic device may traverse coordinates of opaque pixels on the left edge or the right edge of the graffiti letter image, obtain a coordinate value of a pixel at a key point location in opaque pixels by traversing the opaque pixels on the left edge or the right edge of the graffiti letter image, or obtain coordinate values of all pixels on the left edge or the right edge, and determine shape information of the left edge or shape information of the right edge of the graffiti letter image based on the coordinate value of the pixel at the key point location or the coordinate values of all the pixels on the left edge or the right edge.

It can be understood that a corresponding combination command is executed for a shape of the graffiti letter image in the font library. The shape includes but is not limited to various shapes provided in the foregoing embodiments, and may further include another shape. The graffiti pattern may be a pattern including a plurality of graffiti letter images, or may be a pattern including another character.

It should be further understood that the attribute information of the graffiti letter image and the combination command corresponding to the attribute information that are provided in this embodiment of this application are merely examples, and not all combination processing steps are mandatory steps, or not all combination commands corresponding to all attribute information are mandatory. In a use process, one combination command or a combination of at least two combination commands may be used based on a requirement of the graffiti letter image in the font library or the gallery. A combination manner of a plurality of combination commands is not specifically limited herein.

For example, after the angle combination command is executed, an overlapping and combination command is executed based on an attribute, namely, the ratio of the overlapping area. Alternatively, after the left edge information and the right edge information of the graffiti letter image are obtained, the overlapping and combination command may still be executed based on the attribute, namely, the ratio of the overlapping area, without invoking a spacing combination command associated with the combination pair.

In a possible implementation, the text information is further associated with a background image of the graffiti letter image, a size of the background image is greater than a size of the graffiti letter image, the background image is in a one-to-one correspondence with the graffiti letter image, and the graffiti pattern generation method further includes:

calculating a location of the background image based on a central location of the graffiti letter image, the size of the graffiti letter image, and the size of the background image, to obtain an overall background image corresponding to a plurality of graffiti letter images; and disposing layers of the plurality of graffiti letter images above a layer at which the overall background image is located, to obtain the graffiti pattern with an edge.

Figure 13:
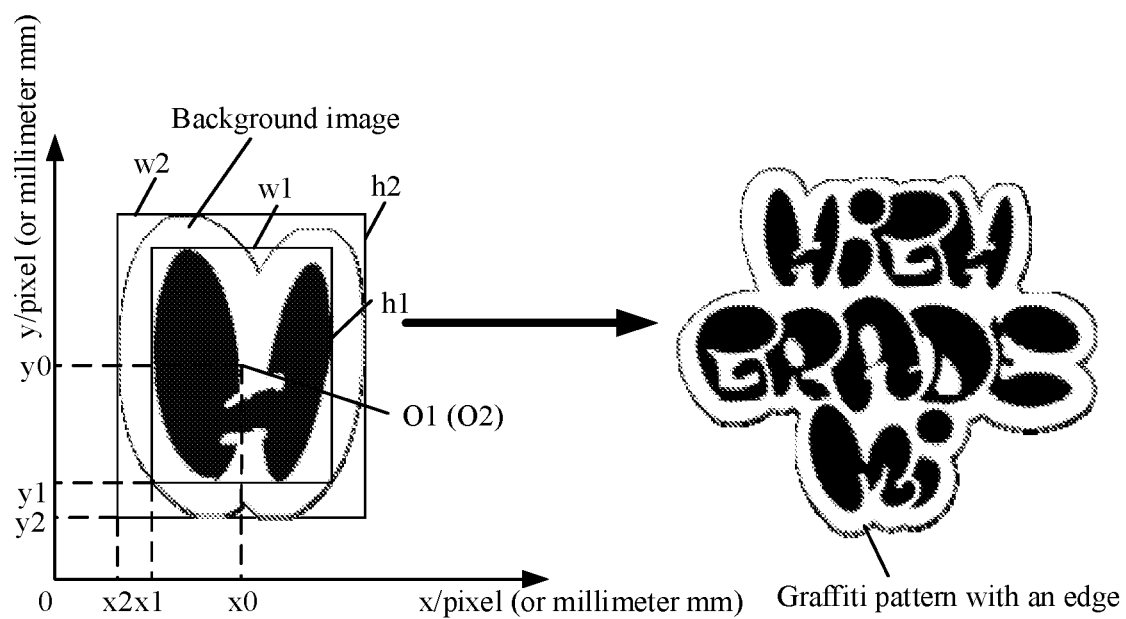
FIG. 13 is a schematic diagram of another effect of processing a graffiti letter image according to an embodiment of this application.

For example, FIG. 13 is a schematic diagram of another effect of processing a graffiti letter image according to an embodiment of this application. The background image may be a specified image that is stored together with the font library and is in a one-to-one correspondence with the graffiti letter images in the font library, for example, a background image of a single graffiti letter image shown in FIG. 13.

After a location of the graffiti letter image is determined, a center of the background image overlaps a center of a corresponding graffiti letter image, and a location of the background image is determined based on the size of the graffiti letter image and the size of the background image.

As shown in FIG. 13, in a rectangular coordinate system xoy, x is used as a horizontal axis, y is a vertical axis, and a unit may be a pixel or millimeter mm. Location coordinates of a graffiti letter image "H" are (x1, y1), and are determined based on a location of the graffiti letter image in a display area. The central location of the graffiti letter image is O1 (x0, y0), the center O2 of the background image overlaps the center of the graffiti letter image, and location coordinates (x2, y2) of the background image is calculated based on the size (including a height h1 and a width w1) of the graffiti letter image and the size (including a height h2 and a width w2) of the background image.

If coordinates of O1 are (x1+w1/2, y1+h1/2), the location coordinates (x2, y2) of the background image are (x1+(w1−w2)/2, y1+(h1−h2)/2). Therefore, a location of a background image of each graffiti letter image can be determined. The layers of the plurality of graffiti letter images are disposed above the layer at which the overall background image is located, to obtain the graffiti pattern with an edge.

Figure 14:
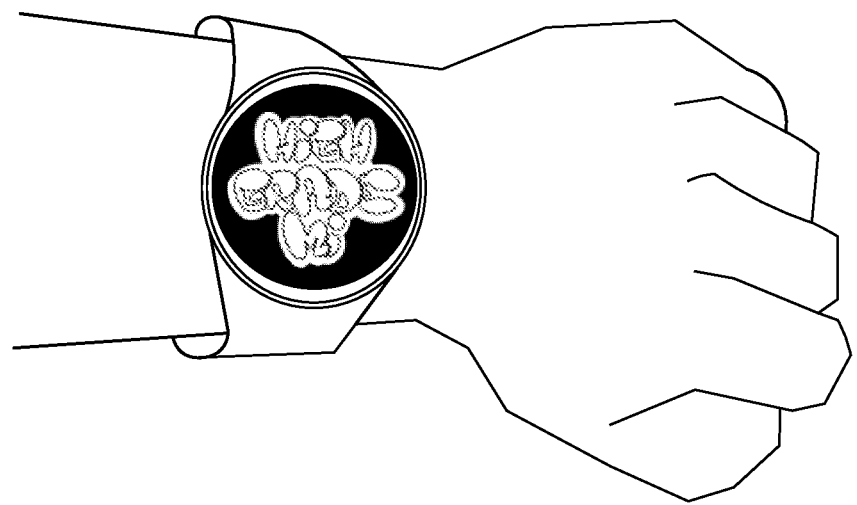
FIG. 14 is a schematic diagram of displaying a graffiti pattern in a display interface of an electronic device according to an embodiment of this application.

In a possible implementation, the graffiti pattern is displayed in a screen-off interface, a lock screen interface, or a camera photographing interface of the electronic device. The displaying the graffiti pattern on the electronic device further includes displaying the graffiti pattern in a screen-locked state or an unlocked state of a smartwatch. In other words, the graffiti pattern is used as a screen locking pattern or an unlocking pattern of the smartwatch. FIG. 14 is a schematic diagram of displaying a graffiti pattern in a display interface of an electronic device according to an embodiment of this application. An unlocking graffiti pattern of a watch dial of the smartwatch is generated according to the foregoing embodiment.

In this embodiment of this application, in the setting interface of the graffiti pattern of the electronic device, the electronic device may receive the text information entered by the user. The electronic device performs combination processing on the graffiti character image based on the attribute information of the graffiti letter image correspondingly associated with the text information, to generate a plurality of graffiti patterns based on different graffiti letter images. A manner in which the electronic device downloads and stores a large quantity of pictures in advance, occupying storage space does not need to be performed, to save storage space of the electronic device, improve performance of a personalized application of the electronic device, and meet a personalized requirement of the user for the electronic device.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application.

It should be understood that the foregoing steps performed by the electronic device may also be performed by an apparatus (for example, a chip) applied to the electronic device. Alternatively, the steps performed by the electronic device may be performed by a processor shown in FIG. 2.

It may be understood that, to implement the foregoing functions, the electronic device includes a corresponding hardware and/or software module for performing each function. With reference to the examples described in embodiments disclosed in this specification, the algorithm steps can be implemented by hardware or a combination of hardware and computer software in this application. Whether a function is performed by hardware or hardware driven by computer software depends on particular applications and design constraints of the technical solutions. Persons skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module may be obtained through division for a corresponding function, or two or more functions may be integrated into one processing module. The foregoing integrated module may be implemented in a form of hardware. It should be noted that, in embodiments of this application, division into the modules is an example and is merely logical function division, and may be other division in an actual implementation.

Figure 16:
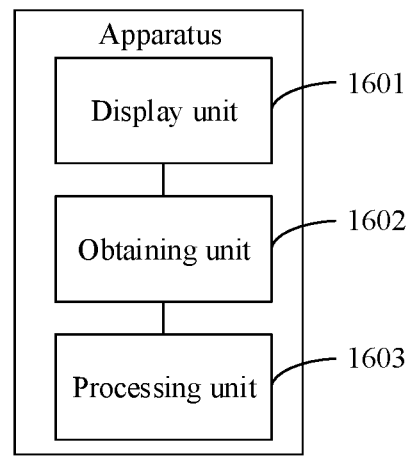
FIG. 16 is a schematic diagram of a composition structure of a graffiti pattern generation apparatus according to an embodiment of this application.

Corresponding to embodiments of the graffiti pattern generation method and the application scenario described in the foregoing embodiments, FIG. 16 is a block diagram of a structure of a graffiti pattern generation apparatus according to another embodiment of this application. For ease of description, only a part related to embodiments of this application is shown.

Refer to FIG. 16. An apparatus includes a display unit 1601, an obtaining unit 1602, and a processing unit 1603. Functions of the units are as follows:

The display unit 1601 may be configured to support an electronic device 100 to perform step S1501, or the like and/or another process of the technology described in this specification.

The obtaining unit 1602 may be configured to support the electronic device 100 to perform step S1502, or the like and/or another process of the technology described in this specification.

The processing unit 1603 may be configured to support the electronic device 100 to perform step S1503, or the like and/or another process of the technology described in this specification.

It should be noted that, all related content of steps in the foregoing method embodiments may be cited in function descriptions of corresponding functional modules. Details are not described herein again.

The apparatus provided in this embodiment of this application may be specifically a chip, a component, or a module, and the apparatus includes a processor and a memory that are connected. The memory is configured to store computer-executable instructions. When the apparatus runs, the processor may execute computer instructions stored in the memory, so that the chip performs the graffiti pattern generation method in the foregoing method embodiment.

In this embodiment of this application, in a setting interface of a graffiti pattern of the electronic device, the electronic device may receive text information entered by a user. The electronic device performs combination processing on a graffiti character image based on attribute information of a graffiti letter image correspondingly associated with the text information, to generate a plurality of graffiti patterns based on different graffiti letter images. A manner in which the electronic device downloads and stores a large quantity of pictures in advance, occupying storage space does not need to be performed, to save storage space of the electronic device, improve performance of a personalized application of the electronic device, and meet a personalized requirement of the user for the electronic device. There is strong usability and practicability.

For example, the apparatus may be included in the electronic device, and the apparatus has a function of implementing a behavior of the electronic device in the foregoing aspect and the possible implementations of the foregoing aspect. The function may be implemented by using hardware, or may be implemented by using hardware executing corresponding software. The hardware or the software includes one or more modules or units corresponding to the foregoing functions, for example, a display module or unit, an obtaining module or unit, or a processing module or unit.

It may be clearly understood by persons skilled in the art that, for the purpose of convenient and brief description, division of the foregoing functional units and modules is used as an example for illustration. In actual application, the foregoing functions can be allocated to different functional units and modules and implemented based on a requirement, that is, an inner structure of the apparatus is divided into different functional units or modules to implement all or some of the functions described above. Functional units and modules in embodiments may be integrated into one processing unit, or each of the units may exist alone physically, or two or more units are integrated into one unit. The integrated unit may be implemented in a form of hardware, or may be implemented in a form of a software functional module. In addition, specific names of the functional units and modules are merely used to distinguish between each other, and are not used to limit the protection scope of this application. For a detailed working process of the units and modules in the foregoing system, refer to a corresponding process in the method embodiments. Details are not described herein again.

The electronic device provided in embodiments is configured to perform the graffiti pattern generation method. Therefore, an effect the same as that of the foregoing implementation method can be achieved.

In a case of an integrated unit, the electronic device may include a processing module, a storage module, and a communication module. The processing module may be configured to control and manage an action of the electronic device, for example, may be configured to support the electronic device to perform steps performed by the display unit 1601, the obtaining unit 1602, and the processing unit 1603. The storage module may be configured to support the electronic device to execute stored program code, data, or the like. The communication module may be configured to support communication between the electronic device and another device.

The processing module may be a processor or a controller. The processing module may implement or execute logical blocks, modules, and circuits in various examples described with reference to content disclosed in this application. The processor may be a combination that implements a computing function, for example, a combination including one or more microprocessors, or a combination of digital signal processing (digital signal processing, DSP) and a microprocessor. The storage module may be a memory. The communication module may be specifically a device that interacts with another electronic device, for example, a radio frequency circuit, a Bluetooth chip, or a Wi-Fi chip.

In an embodiment, when the processing module is a processor, and the storage module is a memory, the electronic device in embodiments may be a device having a structure shown in FIG. 1.

An embodiment of this application further provides a computer-readable storage medium. The computer-readable storage medium stores a computer program. When the computer program is executed by an electronic device, the electronic device is enabled to implement the graffiti pattern generation method in the foregoing embodiments.

An embodiment of this application further provides a computer program product including instructions. When the computer program product runs on an electronic device or a processor, the computer or the processor is enabled to perform one or more steps in any one of the foregoing methods.

All or some of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

When the foregoing integrated unit is implemented in the form of a software functional unit and sold or used as an independent product, the integrated unit may be stored in a computer-readable storage medium. Based on such an understanding, all or some of the procedures in the method in embodiments may be implemented by using a computer program instructing related hardware in this application. The computer program may be stored in a computer-readable storage medium. When the computer program is executed by a processor, the steps in the method embodiments may be implemented. The computer program includes computer program code, and the computer program code may be in a source code form, an object code form, an executable file form, some intermediate forms, or the like. The computer-readable storage medium may include at least any entity or apparatus that can carry the computer program code to a photographing apparatus/terminal device, a recording medium, a computer memory, a read-only memory (Read-Only Memory, ROM), a random access memory (Random Access Memory, RAM), an electrical carrier signal, a telecommunication signal, and a software distribution medium, for example, a USB flash drive, a removable hard disk, a magnetic disk, or an optical disc. In some judicial districts, a computer-readable medium may not be an electrical carrier signal and a telecommunication signal based on legislation and patent practice.

The processor may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA), or another programmable logic device, discrete gate or transistor logic device, discrete hardware component, or the like. The general-purpose processor may be a microprocessor, or the processor may be any conventional processor or the like.

The memory may include forms of a volatile memory, a random access memory (RAM), and/or a nonvolatile memory in computer-readable media, such as a read-only memory (ROM) or a flash memory (flash RAM). The memory is an example of a computer-readable medium.

In the foregoing embodiments, the description of each embodiment has respective focuses. For a part that is not described in detail in an embodiment, reference may be made to related descriptions in other embodiments.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/device and method may be implemented in other manners. For example, the described apparatus/device embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

It should be understood that the term "including" indicates existence of the described features, entireties, steps, operations, elements, and/or components when used in this specification and the appended claims of this application, but does not exclude existence or addition of one or more other features, entireties, steps, operations, elements, components, and/or sets thereof.

It should be further understood that the term "and/or" used in this specification and the appended claims of this application indicates any or all possible combinations of one or more associated listed items, and includes these combinations.

The term "if" used in this specification and the appended claims of this application may be interpreted as "when" or "once" or "in response to determining" or "in response to detecting" based on the context. Similarly, the phrase "if it is determined that" or "if (a stated condition or event) is detected" may be interpreted as "when it is determined that" or "in response to determining" or "once (a stated condition or event) is detected" or "in response to detecting (a stated condition or event)" based on the context.

In addition, in the description of this specification and the appended claims of this application, the terms "first", "second", "third", and the like are only used to distinguish descriptions, but cannot be understood as indicating or implying relative importance.

Referring to "one embodiment", "some embodiments", or the like described in this specification of this application means that specific features, structures, or features described with reference to embodiments are included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A graffiti pattern generation method, applied to an electronic device, the graffiti pattern generation method comprising:
    displaying a setting interface of a graffiti pattern of the electronic device;
    obtaining text information entered by a user in the setting interface, wherein the text information is associated with a background image of a graffiti letter image, a size of the background image is greater than a size of the graffiti letter image, and the background image is in a one-to-one correspondence with the graffiti letter image;
    determining, based on the text information, attribute information of the graffiti letter image associated with the text information;
    executing a combination command corresponding to the attribute information;
    performing combination processing on the graffiti letter image to obtain the graffiti pattern, wherein performing the combination processing on the graffiti letter image to obtain the graffiti pattern comprises:
        calculating a location of the background image based on a central location of the graffiti letter image, the size of the graffiti letter image, and the size of the background image, to obtain an overall background image corresponding to a plurality of graffiti letter images; and
        disposing layers of the plurality of graffiti letter images above a layer at which the overall background image is located, to obtain the graffiti pattern with an edge; and
    applying the graffiti pattern to a display of an application on the electronic device, wherein the application comprises a watermark application.

2. The graffiti pattern generation method according to claim 1, wherein the attribute information comprises a ratio of an overlapping area between a first graffiti letter image and a second graffiti letter image, the text information is associated with a plurality of graffiti letter images, and wherein the executing a combination command corresponding to the attribute information, and performing combination processing on the graffiti letter image comprises:
    obtaining a first total quantity of opaque pixels in the first graffiti letter image and opaque pixels in the second graffiti letter image;
    obtaining a second total quantity of opaque pixels in the overlapping area between the first graffiti letter image and the second graffiti letter image, wherein an opaque pixel in the overlapping area is an opaque pixel in both of the first graffiti letter image and the second graffiti letter image;
    using a ratio of the second total quantity to the first total quantity as the ratio of the overlapping area; and
    performing combination processing on the first graffiti letter image and the second graffiti letter image based on the ratio of the overlapping area, wherein the ratio of the overlapping area meets a preset threshold, and wherein the first graffiti letter image and the second graffiti letter image are two adjacent images in the plurality of graffiti letter images.

3. The graffiti pattern generation method according to claim 2, wherein the first graffiti letter image is located on a left side of the second graffiti letter image, an overlapping relationship of the overlapping area is that a first layer is located on a previous layer of a second layer, the first layer is a layer at which the first graffiti letter image is located, and the second layer is a layer at which the second graffiti letter image is located.

4. The graffiti pattern generation method according to claim 1, wherein the attribute information comprises tilt angle information of each graffiti letter image, the combination command comprises an angle combination command, the text information is associated with a plurality of graffiti letter images, and wherein the executing a combination command corresponding to the attribute information, and performing combination processing on the graffiti letter image comprises:
    executing, based on an association relationship between the tilt angle information of the graffiti letter image and location information of the graffiti letter image in the plurality of graffiti letter images, the angle combination command corresponding to the association relationship; and adjusting an angle of the graffiti letter image based on the tilt angle information corresponding to the location information.

5. The graffiti pattern generation method according to claim 1, wherein the attribute information comprises left edge information and right edge information of each graffiti letter image, the combination command comprises a spacing combination command, the text information is associated with a plurality of graffiti letter images, and wherein the executing a combination command corresponding to the attribute information, and performing combination processing on the graffiti letter image comprises:

executing, based on a combination pair of right edge information of a first graffiti letter image and left edge information of a second graffiti letter image, the spacing combination command corresponding to the combination pair; and performing combination processing on the first graffiti letter image and the second graffiti letter image based on a preset spacing, wherein:

the first graffiti letter image and the second graffiti letter image are two adjacent images in the plurality of graffiti letter images, the first graffiti letter image is located on a left side of the second graffiti letter image, and the left edge information and the right edge information of each respective graffiti letter image are respectively used to represent shape information of a left edge and a right edge of each respective graffiti letter image.

6. The graffiti pattern generation method according to claim 5, wherein the method further comprises:

obtaining pixel coordinates of each opaque pixel on each of the left edge and the right edge of each respective graffiti letter image; and determining the left edge information and the right edge information of each graffiti letter image based on the pixel coordinates.

7. The graffiti pattern generation method according to claim 1, wherein the method further comprises:

displaying the graffiti pattern in a screen-off interface, a lock screen interface, or a camera photographing interface of the electronic device.

8. The graffiti pattern generation method according to claim 1, wherein the attribute information is determined based on a font library or gallery stored on the electronic device.

9. An electronic device, comprising:
one or more processors; and
a non-transitory computer readable medium storing one or more instructions that when executed by the one or more processors, cause the electronic device to perform operations comprising:

displaying a setting interface of a graffiti pattern of the electronic device;

obtaining text information entered by a user in the setting interface, wherein the text information is further associated with a background image of a graffiti letter image, a size of the background image is greater than a size of the graffiti letter image, the background image is in a one-to-one correspondence with the graffiti letter image;

determining, based on the text information, attribute information of the graffiti letter image associated with the text information;

executing a combination command corresponding to the attribute information;

performing combination processing on the graffiti letter image to obtain the graffiti pattern, wherein performing the combination processing on the graffiti letter image to obtain the graffiti pattern comprises:

calculating a location of the background image based on a central location of the graffiti letter image, the size of the graffiti letter image, and the size of the background image, to obtain an overall background image corresponding to a plurality of graffiti letter images; and disposing layers of the plurality of graffiti letter images above a layer at which the overall background image is located, to obtain the graffiti pattern with an edge; and applying the graffiti pattern to a display of an application on the electronic device, wherein the application comprises a watermark application.

10. The electronic device according to claim 9, wherein the operations further comprise:

displaying the graffiti pattern in a screen-off interface, a lock screen interface, or a camera photographing interface of the electronic device.

11. The electronic device according to claim 9, wherein the attribute information comprises a ratio of an overlapping area between a first graffiti letter image and a second graffiti letter image, the text information is associated with a plurality of graffiti letter images, and wherein the executing a combination command corresponding to the attribute information, and performing combination processing on the graffiti letter image comprises:

obtaining a first total quantity of opaque pixels in the first graffiti letter image and opaque pixels in the second graffiti letter image;

obtaining a second total quantity of opaque pixels in the overlapping area between the first graffiti letter image and the second graffiti letter image, wherein an opaque pixel in the overlapping area is an opaque pixel in both of the first graffiti letter image and the second graffiti letter image;

using a ratio of the second total quantity to the first total quantity as the ratio of the overlapping area; and performing combination processing on the first graffiti letter image and the second graffiti letter image based on the ratio of the overlapping area, wherein the ratio of the overlapping area meets a preset threshold, and wherein the first graffiti letter image and the second graffiti letter image are two adjacent images in the plurality of graffiti letter images.

12. The electronic device according to claim 11, wherein the first graffiti letter image is located on a left side of the second graffiti letter image, an overlapping relationship of the overlapping area is that a first layer is located on a previous layer of a second layer, the first layer is a layer at which the first graffiti letter image is located, and the second layer is a layer at which the second graffiti letter image is located.

13. The electronic device according to claim 9, wherein the attribute information comprises tilt angle information of each graffiti letter image, the combination command comprises an angle combination command, the text information is associated with a plurality of graffiti letter images, and wherein the executing a combination command corresponding to the attribute information, and performing combination processing on the graffiti letter image comprises:

executing, based on an association relationship between the tilt angle information of the graffiti letter image and location information of the graffiti letter image in the plurality of graffiti letter images, the angle combination command corresponding to the association relationship; and adjusting an angle of the graffiti letter image based on the tilt angle information corresponding to the location information.

14. The electronic device according to claim 9, wherein the attribute information comprises left edge information and right edge information of each graffiti letter image, the combination command comprises a spacing combination command, the text information is associated with a plurality of graffiti letter images, and wherein the executing a combination command corresponding to the attribute information, and performing combination processing on the graffiti letter image comprises:

executing, based on a combination pair of right edge information of a first graffiti letter image and left edge information of a second graffiti letter image, the spacing combination command corresponding to the combination pair; and performing combination processing on the first graffiti letter image and the second graffiti letter image based on a preset spacing, wherein:

the first graffiti letter image and the second graffiti letter image are two adjacent images in the plurality of graffiti letter images, the first graffiti letter image is located on a left side of the second graffiti letter image, and the left edge information and the right edge information of each respective graffiti letter image are respectively used to represent shape information of a left edge and a right edge of each respective graffiti letter image.

15. The electronic device according to claim 9, wherein the attribute information is determined based on a font library or gallery stored on the electronic device.

16. A non-transitory computer-readable storage medium storing one or more instructions executable by an electronic device to perform operations comprising:

displaying a setting interface of a graffiti pattern of the electronic device;

obtaining text information entered by a user in the setting interface, wherein the text information is further associated with a background image of a graffiti letter image, a size of the background image is greater than a size of the graffiti letter image, the background image is in a one-to-one correspondence with the graffiti letter image;

determining, based on the text information, attribute information of the graffiti letter image associated with the text information;

executing a combination command corresponding to the attribute information;

performing combination processing on the graffiti letter image to obtain the graffiti pattern, wherein performing the combination processing on the graffiti letter image to obtain the graffiti pattern comprises:

calculating a location of the background image based on a central location of the graffiti letter image, the size of the graffiti letter image, and the size of the background image, to obtain an overall background image corresponding to a plurality of graffiti letter images; and disposing layers of the plurality of graffiti letter images above a layer at which the overall background image is located, to obtain the graffiti pattern with an edge; and applying the graffiti pattern to a display of an application on the electronic device, wherein the application comprises a watermark application.

17. The non-transitory computer-readable storage medium according to claim 16, wherein the operations further comprise:

displaying the graffiti pattern in a screen-off interface, a lock screen interface, or a camera photographing interface of the electronic device.

18. The non-transitory computer-readable storage medium according to claim 16, wherein the attribute information comprises a ratio of an overlapping area between a first graffiti letter image and a second graffiti letter image, the text information is associated with a plurality of graffiti letter images, and wherein the executing a combination command corresponding to the attribute information, and performing combination processing on the graffiti letter image comprises:

obtaining a first total quantity of opaque pixels in the first graffiti letter image and opaque pixels in the second graffiti letter image;

obtaining a second total quantity of opaque pixels in the overlapping area between the first graffiti letter image and the second graffiti letter image, wherein an opaque pixel in the overlapping area is an opaque pixel in both of the first graffiti letter image and the second graffiti letter image;

using a ratio of the second total quantity to the first total quantity as the ratio of the overlapping area; and performing combination processing on the first graffiti letter image and the second graffiti letter image based on the ratio of the overlapping area, wherein the ratio of the overlapping area meets a preset threshold, and wherein the first graffiti letter image and the second graffiti letter image are two adjacent images in the plurality of graffiti letter images.

19. The non-transitory computer-readable storage medium according to claim 18, wherein the first graffiti letter image is located on a left side of the second graffiti letter image, an overlapping relationship of the overlapping area is that a first layer is located on a previous layer of a second layer, the first layer is a layer at which the first graffiti letter image is located, and the second layer is a layer at which the second graffiti letter image is located.

20. The non-transitory computer-readable storage medium according to claim 16, wherein the attribute information comprises tilt angle information of each graffiti letter image, the combination command comprises an angle combination command, the text information is associated with a plurality of graffiti letter images, and wherein the executing a combination command corresponding to the attribute information, and performing combination processing on the graffiti letter image comprises:

executing, based on an association relationship between the tilt angle information of the graffiti letter image and location information of the graffiti letter image in the plurality of graffiti letter images, the angle combination command corresponding to the association relationship; and adjusting an angle of the graffiti letter image based on the tilt angle information corresponding to the location information.

* * * * *